United States Patent
Kochar et al.

(10) Patent No.: US 10,417,659 B1
(45) Date of Patent: Sep. 17, 2019

(54) METHOD, APPARATUS, AND COMPUTER PROGRAM PRODUCT FOR AUTOMATED APPROVAL OF A PROMOTION STRUCTURE

(71) Applicant: Groupon, Inc., Chicago, IL (US)

(72) Inventors: Kavita Kochar, Chicago, IL (US); Marcus Sacco, Chicago, IL (US)

(73) Assignee: GROUPON, INC., Chicago, IL (US)

( * ) Notice: Subject to any disclaimer, the term of this patent is extended or adjusted under 35 U.S.C. 154(b) by 0 days.

(21) Appl. No.: 14/573,299

(22) Filed: Dec. 17, 2014

Related U.S. Application Data

(60) Provisional application No. 61/943,619, filed on Feb. 24, 2014, provisional application No. 61/918,321, filed on Dec. 19, 2013.

(51) Int. Cl.
*G06Q 30/00* (2012.01)
*G06Q 30/02* (2012.01)

(52) U.S. Cl.
CPC ..... *G06Q 30/0249* (2013.01); *G06Q 30/0247* (2013.01)

(58) Field of Classification Search
USPC .......................................................... 705/14
See application file for complete search history.

(56) References Cited

U.S. PATENT DOCUMENTS

| 2002/0165844 | A1 | 11/2002 | Lee et al. | |
| --- | --- | --- | --- | --- |
| 2003/0177060 | A1 | 9/2003 | Seagraves | |
| 2006/0253345 | A1 | 11/2006 | Heber | |
| 2007/0124737 | A1 | 5/2007 | Wensley et al. | |
| 2012/0233237 | A1 | 9/2012 | Roe et al. | |
| 2013/0346186 | A1* | 12/2013 | Bezos et al. | 705/14.43 |
| 2014/0046757 | A1 | 2/2014 | Kahn et al. | |
| 2014/0108121 | A1* | 4/2014 | Norton et al. | 705/14.35 |
| 2014/0195336 | A1* | 7/2014 | Dublin et al. | 705/14.44 |
| 2014/0222593 | A1* | 8/2014 | Cosman | 705/14.73 |
| 2014/0324602 | A1 | 10/2014 | Hummel et al. | |

OTHER PUBLICATIONS

Office Action for U.S. Appl. No. 14/565,534 dated Oct. 17, 2016.
Web Conferencing Guide, Web Conferencing History Section, downloaded from https://web.archive.org/web/20100826092210/http://www.netschmoozer.net/permalink.php?article=web+conferencing+history.txt on Oct. 6, 2016—with header.

(Continued)

*Primary Examiner* — Alvin L Brown
(74) *Attorney, Agent, or Firm* — Alston & Bird LLP

(57) ABSTRACT

A method, apparatus and computer program product are provided for integrated sales management. A sales resource may use the system to track and modify promotion proposals for providers. Data defining the proposed promotion may include information relating to the provider, capacity, the promotion structure, return on investment, and/or an auto-approval status. Some data defining the proposed promotion may be automatically generated by the promotional system and/or modified by the provider. The proposal may be auto-approved or approved manually by a sales resource. Upon approval, the promotion may be made available for sale.

12 Claims, 23 Drawing Sheets

(56) References Cited

OTHER PUBLICATIONS

Web Conferencing Guide, Web Conferencing History Section, downloaded from https://web.archive.org/web/20100826092210/http://www.netschmoozer.net/permalink.php?article=web+conferencing+history.txt on Oct. 6, 2016—without header.
Comparison of web conferencing software, from Wikipedia, downloaded from https://en.wikipedia.org/w/index.php?title=Comparison_of_web_conferencing_software&oldid=586380179 on Oct. 6, 2016.
How to Write Advertisements that Sell, A. W. Shaw co., from System, the magazine of Business, dated 1912.
Office Action for U.S. Appl. No. 14/565,534 dated Jul. 9, 2015.
U.S. Appl. No. 13/749,272, filed Jan. 24, 2013; In re: Wicha entitled *Method, Apparatus, and Computer Readable Medium for Providing a Self-Service Interface*.
U.S. Appl. No. 13/927,742, filed Jun. 26, 2013; In re: Sacco entitled *Method, Apparatus, and Computer Program Product for Providing Mobile Location Based Sales Lead Identification*.
U.S. Appl. No. 61/682,762, filed Aug. 13, 2012; In re: Shariff entitled *Unified Payment and Return on Investment System*.
U.S. Appl. No. 14/038,610, filed Sep. 26, 2013; in re: Nkengla entitled *Automated Deal Guide Optimization*.
Office Action for U.S. Appl. No. 14/565,534 dated Feb. 6, 2015.
TeamViewer, from Wikipedia, downloaded from https://en.wikipedia.org/wiki/TeamViewer on Dec. 3, 2015.
GoToMeeting, from Wikipedia, downloaded from https://en.wikipedia.org/wiki/GoToMeeting on Dec. 3, 2015.
Referralsaasquatch, How to Calculate Return on Investment in a Referral Program, dated Aug. 26, 2013, downloaded from https://www.referralsaasquatch.com/how-to-calculate-the-return-on-investment-of-a-referral-program (https://web.archive.org/web/20140423002402/http://www.referalsassquatch.com) (dated Apr. 23, 2014) 3 pages.

* cited by examiner

METHOD, APPARATUS, AND COMPUTER PROGRAM PRODUCT FOR AUTOMATED APPROVAL OF A PROMOTION STRUCTURE

CROSS REFERENCES TO RELATED APPLICATIONS

This application claims the benefit of priority to U.S. Provisional Application No. 61/943,619, filed Feb. 24, 2014 and titled, "Method, Apparatus, And Computer Program Product For Providing Management Of Sales Proposals," and is hereby incorporated by reference in its entirety.

This application also claims the benefit of priority to U.S. Provisional Application No. 61/918,321, filed Dec. 19, 2013 and titled, "Method, Apparatus, And Computer Program Product For Providing Management Of Sales Proposals," and is hereby incorporated by reference in its entirety.

The present application is also related to: 1) U.S. Patent Application No. 61/682,762, filed Aug. 13, 2012, titled "Unified Payment And Return On Investment System," 2) U.S. patent application Ser. No. 13/749,272, filed Jan. 24, 2013, titled "Method, Apparatus, And Computer Readable Medium For Providing A Self-Service Interface," 3) U.S. patent application Ser. No. 13/927,742, filed Jun. 26, 2013, titled "Method, Apparatus, And Computer Program Product For Providing Mobile Location Based Sales Lead Identification," 4) U.S. patent application Ser. No. 14/041,890, filed Sep. 30, 2013, titled "Automated Approval Of Generated Promotions," 5) U.S. patent application Ser. No. 13/929,253, filed Jun. 27, 2013, titled "Fine Print Builder," 6) U.S. patent application Ser. No. 13/841,347, filed Mar. 15, 2013, titled "Unified Payment And Return On Investment System," 7) U.S. Patent Application No. 61/824,850, filed May 17, 2013, titled "Unified Payment And Return On Investment System," and 8) U.S. patent application Ser. No. 14/038,610, filed Sep. 26, 2013, titled "Automated Deal Guide Optimization," each of which are hereby incorporated by reference in their entireties.

BACKGROUND

Various embodiments of the invention are related to promotional systems, and particularly to a method and apparatus for providing management and approval of sales proposals. Applicant has discovered problems with and related opportunities relating to sales resources efficiently managing sales of promotions to providers. Through applied effort, ingenuity, and innovation, Applicant has solved many of these identified problems by developing a solution that is embodied by the present invention, which is described in detail below.

BRIEF SUMMARY

A method, apparatus, and computer program product are therefore provided for providing management of promotion sales opportunities, automated approval, and conversion of the promotion sales opportunities to offered promotions. A method is provided for providing a promotion sales management system, the method comprising accessing, remotely from a provider, a provider facing interface, the provider facing interface populated with one or more promotion parameters and one or more provider details, altering at least one of a promotion parameter of a proposed promotion or one or more details for a provider, calculating, with a processor, updated return on investment information based on the altered promotion parameters, and causing the updated return on investment information to be provided to the selected provider via the provider facing interface.

In some embodiments, calculating the updated return on investment information comprises calculating, based on the one or more attributes of the proposed promotion, a first amount indicative of revenue generated from the proposed promotion, attendant to administering the proposed promotion, calculating, based on the one or more indicators of repeat business in response to the proposed promotion, a third amount indicative of revenue generated from repeat business attendant to administering the proposed promotion, calculating, based on the one or more attributes of the promotion, a fourth amount indicative of costs from the proposed promotion, and generating a graphical representation comparing the first, second, and third amounts with the fourth amount.

In some embodiments, the promotion parameters comprise a plurality of options to be offered as part of the promotion, each option having a respective quantity and value. The method may further comprise updating capacity information comprising information regarding maximum capacity for the provider based on the provider availability and a time needed to fulfill promotions based on the promotion parameters, wherein the updated capacity information comprises information regarding maximum capacity for the provider, the maximum capacity based on the provider availability and a time needed to fulfill promotions based on the promotion parameters, and causing display of the updated capacity information to the provider via the provider facing interface.

In some embodiments, the return on investment information is a summary of return on investment information based on at least two proposed promotions. In some embodiments, the method further comprises causing a plurality of proposed promotions associated with a selected provider to be displayed. In some embodiments, the one or more promotion parameters may have been provided by the provider in a previous interaction with the provider facing interface.

In some embodiments, the method may comprise receiving an indication, remotely from the provider, of a plurality of options to be offered as part of the promotion, each option having a respective quantity and value, and causing display of the plurality of options to the provider via the provider facing interface.

In some embodiments, the method may comprise receiving an indication, remotely from the provider, of a number of units of the proposed promotion to offer each month, and causing display of, via the provider facing interface, the updated number of service hours per month needed to fulfill the number of units.

In some embodiments, the method includes causing a display of a complete proposed promotion to the provider via the provider facing interface, receiving an indication of approval of the proposed promotion from the provider, and generating the proposed promotion and providing units of the proposed promotion to be offered for sale.

In some embodiments, the method includes receiving information identifying one or more locations at which a customer may redeem the proposed promotion and either a product or a service for which the proposed promotion may be redeemed, identifying based on the received information, a relevant fine print clause data structures stored in a memory, wherein the fine print clause data structures are identified based on a predefined association between the promotion and the relevant fine print clause data structures, and causing display of the relevant fine print clause via the provider facing interface.

The method may further include receiving redemption parameters, and causing display of redemption parameters to the provider via the provider facing interface. In some embodiments, the method includes receiving an indication of altered promotion parameters from the provider via the provider facing interface, and causing the altered promotion parameters to be displayed to a sales resource, remote from the provider.

A computer program product is provided for providing a promotion sales management system, the computer program product comprising at least one non-transitory computer-readable medium having computer-readable program instructions stored therein, the computer-readable program instructions comprising instructions, which when performed by an apparatus, are configured to cause the apparatus to perform at least accessing, remotely from a provider, a provider facing interface, the provider facing interface populated with one or more promotion parameters and one or more provider details, altering at least one of a promotion parameter of a proposed promotion or one or more details for a provider, calculating updated return on investment information based on the altered promotion parameters, and causing the updated return on investment information to be provided to the selected provider via the provider facing interface.

An apparatus is provided for providing a promotion sales management system, the apparatus comprising processing circuitry configured to cause the apparatus to perform at least accessing, remotely from a provider, a provider facing interface, the provider facing interface populated with one or more promotion parameters and one or more provider details, altering at least one of a promotion parameter of a proposed promotion or one or more details for a provider, calculating updated return on investment information based on the altered promotion parameters, and causing the updated return on investment information to be provided to the selected provider via the provider facing interface.

A method is provided for receiving capacity information for a provider based on biographical data representing attributes about a provider, identifying a promotion structure from a plurality of promotion structures, wherein the promotion structure is identified based on the capacity information and the biographical data, calculating return on investment (ROI) based on at least the promotion structure, generating promotion terms for the promotion structure, determining an auto-approval status on based at least the promotion structure, and generating a promotion for viewing based on the promotion structure, promotion terms and the auto-approval status.

In some embodiments, receiving capacity information comprises receiving biographical data representing attributes of the provider, calculating a first total units of service available to offer from the provider during a particular time period, calculating a second total units of service potentially available from the provider for an availability time period of the promotion, calculating a third total units of service currently being offered by the provider, and calculating the capacity information for the promotion by subtracting the third total units of services from the second total units of service.

In some embodiments, identifying a promotion structure comprises receiving an indication of the service offered by the provider, causing display of one or more promotion option structures, receiving one or more selections of the one or more promotion option structures, and generating a promotion structure based on the received selections.

In some embodiments, calculating the ROI information based on at least the promotion structure comprises calculating, based on one or more attributes of the promotion structure, a first amount indicative of revenue generated from the promotion structure, calculating, based on an upsell amount exceeding a value of the promotion structure, a second amount indicative of revenue generated from upsells attendant to administering the promotion structure, calculating, based on the one or more indicators of repeat business in response to the promotion structure, a third amount indicative of revenue generated from a promotion and marketing service based on the proposed promotion, and calculating, based on the one or more attributes of the promotion structure, a fourth amount indicative of costs from the promotion structure.

In some embodiments, determining the auto-approval status of the promotion structure comprises determining whether the promotion structure satisfies automatic approval requirements, in an instance in which the automatic approval requirements are satisfied, automatically approve the promotion structure, and in an instance in which the automatic approval requirements are not satisfied, indicate that the promotion structure cannot be automatically approved.

An apparatus is provided for providing a promotion sales management system, the apparatus comprising processing circuitry configured to cause the apparatus to perform at least receiving capacity information for a provider based on biographical data representing attributes about a provider, identifying a promotion structure from a plurality of promotion structures, wherein the promotion structure is identified based on the capacity information and the biographical data, calculating return on investment (ROI) based on at least the promotion structure, generating promotion terms for the promotion structure, determining an auto-approval status on based at least the promotion structure, and generating a promotion for viewing based on the promotion structure, promotion terms and the auto-approval status.

A computer program product is provided for providing a promotion sales management system, the computer program product comprising at least one non-transitory computer-readable medium having computer-readable program instructions stored therein, the computer-readable program instructions comprising instructions, which when performed by an apparatus, are configured to cause the apparatus to perform at least receiving capacity information for a provider based on biographical data representing attributes about a provider, identifying a promotion structure from a plurality of promotion structures, wherein the promotion structure is identified based on the capacity information and the biographical data, calculating return on investment (ROI) based on at least the promotion structure, generating promotion terms for the promotion structure, determining an auto-approval status on based at least the promotion structure, and generating a promotion for viewing based on the promotion structure, promotion terms and the auto-approval status.

DETAILED DESCRIPTION

Glossary

Figure 1:
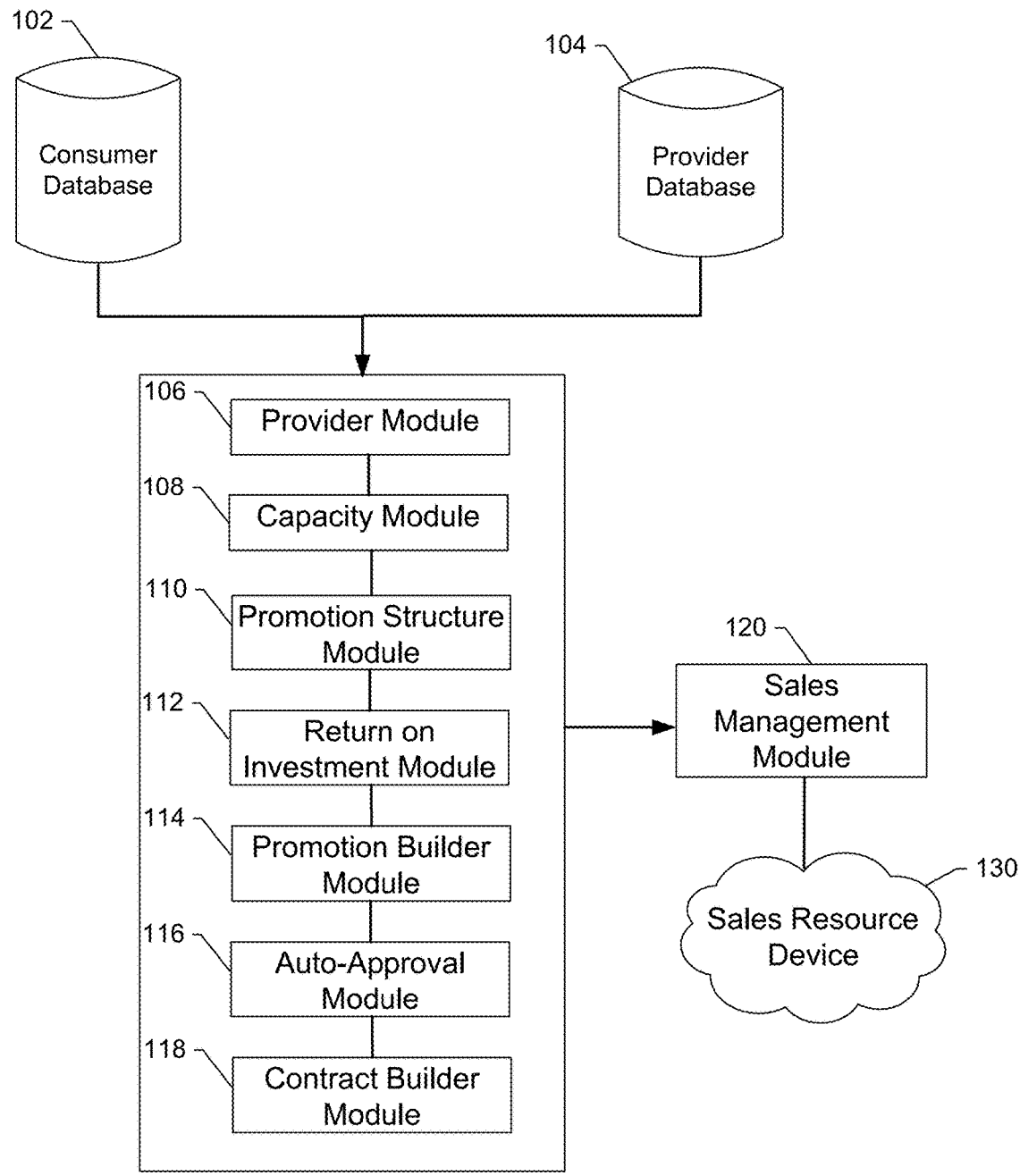
FIG. 1 is a schematic representation of a promotional system that may benefit from some example embodiments of the present invention, according to an example embodiment.

As used herein, the term "provider" may be used interchangeably with "merchant" and may include a business owner, consigner, shopkeeper, tradesperson, vender, operator, entrepreneur, agent, dealer, organization or the like that is in the business of a providing a good, service or experience to a consumer, facilitating the provision of a good, service or experience to a consumer and/or otherwise operating in the stream of commerce. One example merchant may be a running company that sells attire for use by a person who runs or participates in athletic activities.

As used herein, the term "provider details" may be considered any information regarding the provider's business, work volume and/or capacity. For example, the provider details may indicate the services provided, a number of employees able to perform the service each day, employees needed to perform a service, average hours worked per week per employee, and/or current number of services performed per week.

As used herein, the term "consumer" is a recipient of goods, services, promotions, media, or the like provided by the promotion and marketing service and/or a merchant. Consumers may include, without limitation, individuals, groups of individuals, corporations, other merchants, and the like.

The "promotion and marketing service" is a service that provides promotion and/or marketing services on behalf of one or more providers that are offering one or more instruments that are redeemable for goods, services, experiences and/or the like by a consumer. The promotion and marketing service may engage in business with a provider to offer a promotion.

As used herein, a "promotion" may be considered any type of offered, presented or otherwise indicated reward, discount, coupon, credit, deal, incentive, discount, media or the like that is indicative of a promotional value or the like that upon purchase or acceptance results in the issuance of an instrument that may be used toward at least a portion of the purchase of particular goods, services and/or experiences defined by the promotion. Promotional instruments may there be offered for sale by the promotion and marketing service on behalf of a provider. Consumers who purchase a promotional instrument may redeem a promotional instrument at the provider for goods or services.

As used herein, an "instrument" may be any type of tender used in a transaction for at least a portion of the purchase, acquisition, procurement, consumption or the like of goods, services and/or experiences as defined by the terms of the promotion. For example, an instrument may include a physical token (e.g., magnetic strip cards or printed barcodes), virtual account balance (e.g., a promotion being associated with a particular user account on a merchant website), secret code (e.g., a character string that can be entered on a merchant website or point-of-sale), tender, electronic certificate, medium of exchange, voucher, or the like.

As used herein, the term "promotion parameters" may be considered terms and conditions under which the promotion is offered by a promotion and marketing service to consumers. These promotion parameters may include parameters, bounds, considerations and/or the like that outline or otherwise define the terms, timing, constraints, limitations, rules or the like under which the promotion is sold, offered, marketed, or otherwise provided to consumers. Example promotion parameters include, using the aforementioned restaurant as the example provider, limit one instrument per person, total of 100 instruments to be issued, a run duration of when the promotion will be marketed via the promotion and marketing service, and parameters for identifying consumers to be offered the promotion (e.g., factors influencing how consumer locations are used to offer a promotion). The promotion parameters may be considered any information used to generate a promotion and offer units of the promotion for sale, such as units per month, price, redemption parameters, provider parameters, and/or fine print).

As used herein, the term "promotion option" may be an option for a consumer that is mapped to at least one service in a service hierarchy and may also include further details regarding provision of the service that may be relevant to a promotion. In this regard, a promotion option includes a title, and, if it comprises a single-option promotion, a subtitle. If the promotion option comprises a multi-option promotion, however, then each of the multiple options has a corresponding voucher title. In addition, the text of a promotion option (including voucher titles or subtitles) is comprised of a series of features interspersed with stop words (e.g., "the," "is," "at," "which," "on," etc.). Each promotion option is additionally associated with one or more services. Example promotion options, using the aforementioned running company as the example provider, might be "remote private coaching session" and "live private coaching session." In these examples, the features comprising the promotion options are at least "remote," "live," and "private coaching session" (the manner with which features are identified is further discussed below). Other example promotion options outside the context of the running company example may be "Small area: unlimited laser hair-removal sessions for one year" (which may have features "Small area," "unlimited," "laser hair-removal sessions," and "one year"), "Medium area: unlimited laser hair-removal sessions for one year" (which may have features "Medium area," "unlimited," "laser hair-removal sessions," and "one year"), "Full body: six laser hair-removal sessions" (which may have features "Full body" and "six sessions"), and "Large area: unlimited laser hair-removal sessions for one year" (which may have features "Large area," "unlimited," "laser hair-removal sessions," and "one year").

As used herein, the term "redemption parameters" refers to terms and conditions for redeeming or otherwise obtaining the benefit of promotions obtained from a promotion and marketing service. The redemption parameters may include parameters, bounds, considerations and/or the like that outline the term, timing, constraints, limitations, rules or the like for how and/or when an instrument may be redeemed. For example, the redemption parameters may include an indication that the instrument must be redeemed prior to a specified deadline, for a specific good, service or experience and/or the like. For example, redemption parameters may specify a limit of one instrument per visit, that the promotion must be used in store only, or that the promotion must be used by a certain date.

As used herein, the term "contract" is considered an agreement defining the terms of the promotion and roles of the promotion and marketing services and provider with respect to the promotion. The promotion and marketing service enters into a contract with the provider to offer a promotion, as described herein.

As used herein, the term "service" is an action offered by a merchant in exchange for compensation. In this regard, a service may be a general descriptor of the action, and need not include information such as a duration, frequency, total number of times that the action will be performed, or even the compensation necessary for performance of the action. Using the aforementioned running company, an example service may be a private coaching session. In this example, the service itself need not include the duration of the coaching, the frequency of the lessons, the number of lessons that will be provided, or the cost of the lesson.

As used herein, the term "feature" is a descriptor of a service and/or promotion. A feature may be a single word, a bigram (a two term pair), or a trigram (a three term tuples). In some embodiments, a feature may comprise an N-term tuple, where N may be a size that a user, a machine operating an algorithm or the like determines is most appropriate. In relation to the context of a promotion and marketing service, each feature comprises the building blocks of a promotion. Examples of features might be "half-marathon" "half marathon," "5k" "race," "registration," "entry," "one year," "1-year," "1 year," "run jump swim," or the like.

As used herein, the term "promotion option" is a descriptor of a service and/or promotion describing choices of services and/or promotions. A promotion option may be mapped to at least one service in a service hierarchy and may also include further details regarding provision of the service that may be relevant to a promotion. In this regard, a promotion option includes a title, and, if it comprises a single-option promotion, a subtitle. If the promotion option comprises a multi-option promotion, however, then each of the multiple options has a corresponding voucher title. In addition, the text of a promotion option (including voucher titles or subtitles) is comprised of a series of features interspersed with stop words (e.g., "the," "is," "at," "which," "on," etc.). Each promotion option is additionally associated with one or more services. Example promotion options, using the aforementioned running company as the example provider, might be "remote private coaching session" and "live private coaching session." In these examples, the features comprising the promotion options are at least "remote," "live," and "private coaching session" (the manner with which features are identified is further discussed below). Other example promotion options outside the context of the running company example may be "Small area: unlimited laser hair-removal sessions for one year" (which may have features "Small area," "unlimited," "laser hair-removal sessions," and "one year"), "Medium area: unlimited laser hair-removal sessions for one year" (which may have features "Medium area," "unlimited," "laser hair-removal sessions," and "one year"), "Full body: six laser hair-removal sessions" (which may have features "Full body" and "six sessions"), and "Large area: unlimited laser hair-removal sessions for one year" (which may have features "Large area," "unlimited," "laser hair-removal sessions," and "one year"). In some embodiments, promotion options may be scored by the promotion and marketing service, providing a ranking of promotion options based on suitability of the promotion option. Promotion scoring and ranking is described in more detail in U.S. patent application Ser. No. 14/038,610, incorporated by reference herein.

As used herein, the term "component" is equivalent to a grouping of features. Each component accordingly is intended to represent an actual concept, which, when using natural language, can often be described as using or otherwise relating to a large variety of different terms or phrases (e.g., features). Accordingly, each component is associated with a grouping of features that the promotion and marketing service believes have an equivalent meaning in a given context. Examples components might be "race" and "registration," and may have the following groupings of features mapped thereto (each feature comprising a set of one to three words within brackets in this example, although in other examples, each feature may comprise an arbitrarily large number of terms within brackets):

1. Component: race
    [race] ['5k','race'] ['race','entry'] ['race','registration']
    ['race','saturday'] ['race','september'] ['5k','race','8']
    ['5k', 'race','entry'] ['adventure','5k','race']
    ['race','registration','1'] ['race','registration','2']
    ['race','september','29'] ['rad','5k','race']
2. Leisure Offers/Activities Running Component: registration
    [registration] ['5k','registration'] ['race','registration']
    ['registration','2'] ['race','registration','1']
    ['race','registration','2']

As used herein, the term "promotion option structure" refers to the same underlying information as a promotion option, but does not comprise text. Rather, a promotion option structure is made up a series of components that are equivalent to the various features of a promotion option. In this regard, a promotion option structure may correspond to multiple promotion options, in that two promotion options might present the same concept to a user, despite using distinct language. In contrast, no two promotion option structures present the same concept. In addition, promotion option structures also include or otherwise can be mapped to titles generated based on the components included therein. Moreover, each promotion option structure is additional associated with one or more services in a defined service hierarchy. Examples of promotion option structures, using the above example promotion options "remote private coaching session" and "live private coaching session," might be (Component: "remote"; Component: "private coaching session") and (Component: "live"; Component: "private coaching session"), respectively.

As used herein, the term "promotion structure" refers to a particular combination of promotion option structures. In this regard, a promotion structure may include only a single promotion option structure, or may include multiple promotion option structures. For instance, example promotion structures, using the example promotion option structures above, might be the following:
Promotion Structure 1:
    Promotion Option Structure 1:
        Component: "remote"; Component: "private coaching session"

Promotion Structure 2:
  Promotion Option Structure 1:
    Component: "remote"; Component: "private coaching session"
  Promotion Option Structure 2:
    Component: "live"; Component: "private coaching session"

Each promotion structure is, like every promotion option and promotion option structure, associated with one or more services.

As used herein, the term "auto-approval status" refers to an indication associated with a promotion structure that indicates whether or not the promotion structure meets conditions such that the promotion can be generated without manual review by the promotion and marketing service. In this regard, if a provider agrees to a proposal to offer a promotion structure, and the auto-approval status is approved, a promotion and/or contract may be automatically generated. For example, conditions required to have an auto-approval status of approved may relate to price options within a particular band defined for a particular service in a particular area, margin defined within an acceptable band and/or the like.

As used herein, the term "proposal" or "sales proposal" refers to any data used in the creation of a promotion, promotion parameters, promotion structure, and/or the like that is not yet associated with an approved or offered promotion. A sales proposal may therefore be considered a draft promotion or draft contract. Sales resources and providers may work on a proposal by way of a collaborative interface as described herein.

Overview

In some examples, a promotion and marketing service may generate revenue (for the promotion and marketing service and/or provider) by entering into a contract with a provider to offer promotions on behalf of a provider. In order to entice providers to partner with the promotion and marketing service, the promotion and marketing service may show and/or otherwise demonstrate the potential increases in revenue to the provider if the provider were to engage the promotion and marketing service to run one or more proposed promotions. Providing the provider with a tool that illustrates the benefits of working with the promotion and marketing service and utilizes the sophisticated metrics maintained by the promotion and marketing service regarding the market and impact of promotions, may build the provider's confidence in having a successful partnership with the promotion and marketing service.

Some providers may be highly involved in the decision making process of formulating the terms of a promotion offers (e.g., providers that have their own marketing team or marketing experience), whereas other providers may entrust in the expertise of the promotion and marketing service to provide contract and promotion terms that will benefit the provider. As such, a fully integrated sales management tool that allows both the sales resource (e.g., a salesperson, a sales representative or the like) of the promotion and marketing service and the provider to view proposed promotion terms and the impact to the provider in a collaborative environment may therefore be beneficial, in some examples. In some embodiments, the promotion and marketing service may be partially or fully automated to suggest an optimal promotion to a provider, to include the potential impact of the promotion to the provider in terms of return on investment.

However, irrespective of the capabilities of some providers to provide their own promotion parameters, the promotion and marketing service has business reasons, technical reasons and experience reasons that drive the promotion and marketing service to set certain parameters that govern the types of promotions available on the service. Thus, unlike print media that has the opportunity to vet content before the launch of said content, the Internet allows for a promotion to be launched without review. As is described herein, a method that allows for a mechanism for auto-approval is proposed that can work along with or distinct from the traditional review process and solves an explicit problem of a digital based promotion and marketing service.

In some example embodiments, the method, apparatus and computer program product described herein is configured to provide efficient management of promotion sales opportunities to sales resources (e.g., salespersons), of a promotion and marketing service by enabling a seamless process by which a provider may be browse, select and launch a promotion via a sales and marketing service. In some examples, this may include providing functionality made available to providers via a self-service tool (e.g., such as the self-service tool provided in U.S. patent application Ser. No. 13/749,272), to sales resources so that a sales resource may access a proposal created by a provider, and/or access the same or similar information as viewed by the provider such as while discussing the proposal over the phone and/or walking the provider through the proposal.

In other examples, the salesperson may access or otherwise leverage a self-service tool to provide additional information to a provider. In some examples, the provider may fill out a questionnaire or survey, and the sales management tool may automatically provide data relating to a proposed promotion based on the information relating to the provider. Based on the inputs, interaction with the sales resource and decision throughout the process described herein, the provider is advantageously enabled, in some examples, to launch a promotion via the promotion and marketing service.

In some examples, a sales resource may user a sales management module to identify a provider with which the sales resource wishes to partner to offer a promotion. A sales management module provides, in some example embodiments, management and prioritization of sales leads and corresponding provider information, and scheduling of appointments and follow-ups tasks to be completed with or on behalf of the provider. For example, sales leads (e.g., a provider and corresponding provider information) are described in more detail in U.S. patent application Ser. No. 13/927,742, which is incorporated by reference in its entirety herein.

The sales management module integrates, in some examples, sales lead management functionality with a demand information and return on investment (ROI) information for facilitating proposed sales to a provider. One example of an ROI calculation in a sales and marketing service is described in more detail in at least U.S. Patent Application No. 61/682,762 among other applications listed herein, which are all incorporated by reference in their entirety. A sales resource may therefore use the sales management module to configure a sales proposal while following up with a provider, for example, and while taking into consideration demand for the promotion and ROI for the provider and promotion and marketing service.

A sales resource may therefore more efficiently utilize the functionality provided by the sales management module without navigating between various applications, and may access sales resource tools, as well as, the same tools made available, via an interface, to a provider. For example, in an instance in which a provider expresses concerns regarding a sales proposal, the sales resource may adjust promotion parameters (e.g., any information used to generate a promotion and offer units of the promotion for sales, such as, but not limited to, units per month, price, redemption parameters, provider parameters, and/or fine print) and provide updated ROI information to the provider. As such, the sales management module may therefore assist a sales resource in coming to an agreement with a provider.

In some examples, as a proposal is modified by a sales resource and/or provider, an auto-approval status may be provided to the sales resource and/or provider. An indicator providing an auto-approval status may enable either the sales resource and/or provide to make decisions in formulating a promotion structure such that the promotion structure may be automatically approved. A sales resource and/or provider may use the auto-approval status as guidance so as to move the promotion to market in an efficient manner. For example, while utilizing the sales management module, the sales resource and/or provider may see that an auto-approval status changed from approved to not approved, based on a change to one or more promotion parameters, for example. If the sales resource or provider desires an auto-approved proposal, they may choose to revert such a change such that the auto-approval status also reverts to approved.

In some examples, the sales resource may transmit a proposal to the provider for a final approval, generate the promotion to be available for purchase from the promotion and marketing service and/or the like. In some examples, consumers may then purchase promotions from the promotion and marketing service for redemption. As mentioned above, in examples in which an auto-approval status is approved, once the provider approves the proposal, the sales resource may need not review the proposal again. If the auto-approval status is approved, the promotion may be generated automatically.

In some examples, the sales resource may also assist the provider in defining the parameters of the promotion, to include one or more price options, one or more redemption parameters, editorial content, fine print and/or the like. In some examples, the sales resource may assist the provider in defining parameters such that the provider will qualify for auto approval. As such, in some example embodiments, the sales resource may be advantageously injected into a workflow designed to be used by a provider. The sales resource and provider may therefore collaborate on a proposed promotion by using a provider facing interface. In this regard, the sales management module may provide a provider facing interface to both the provider and the sales resource.

Technical Underpinnings and Implementation of Exemplary Embodiments

Embodiments of the present invention now will be described more fully hereinafter with reference to the accompanying drawings, in which some, but not all embodiments of the inventions are shown. Indeed, embodiments of the invention may be embodied in many different forms and should not be construed as limited to the embodiments set forth herein; rather, these embodiments are provided so that this disclosure will satisfy applicable legal requirements. Like numbers refer to like elements throughout.

As used herein, the terms "data," "content," "information" and similar terms may be used interchangeably to refer to data capable of being captured, transmitted, received, displayed and/or stored in accordance with various example embodiments. Thus, use of any such terms should not be taken to limit the spirit and scope of the disclosure. Further, where a computing device is described herein to receive data from another computing device, it will be appreciated that the data may be received directly from the other computing device or may be received indirectly via one or more intermediary computing devices, such as, for example, one or more servers, relays, routers, network access points, base stations, and/or the like. Similarly, where a computing device is described herein to send data to another computing device, it will be appreciated that the data may be sent directly to the another computing device or may be sent indirectly via one or more intermediary computing devices, such as, for example, one or more servers, relays, routers, network access points, base stations, and/or the like.

In some example embodiments, the sales management module is generated by a promotional system for use by a promotion and marketing service. By way of further example, FIG. 1 is a schematic representation of a promotional system that may benefit from some example embodiments of the present invention.

In general, the promotional system 100 may include a consumer database 102 for providing consumer information, past purchase information, and/or the like, which may be used to calculate various demand data for promotions. The provider database 104 may include provider details such as sales leads and information regarding categories or types of products and/or services offered.

The system 100 may further comprise any of a provider module 106, capacity module 108, promotion structure module 110, ROI module 112, promotion builder module 114, auto-approval module 116, and/or contract builder module 118.

In embodiments, the system 100 comprises a provider module 106 for receiving, providing and/or managing data describing attributes of a provider's business (e.g., provider biographical data) that are relevant to the type of service to be provided in a promotion instrument and for calculating, based on the received data, how many units of service the provider's business can provide to customers within a predetermined period of time. The capacity module 108 may calculate the promotion capacity by determining a total of outstanding instruments currently being offered by the provider and subtracting that total from the total number of units of service that the provider potentially can supply.

The promotion structure module 110 may provide various promotion options structures for a provider including various services and costs. The ROI module 112 may provide estimated returns (e.g., return on investment for a promotion) for a proposed promotion for the promotion and marketing service and/or provider. The promotion builder module 114 may track various proposed proposals for each provider. The auto-approval module 116 may determine whether the terms meet the requirements to be auto-approved by the promotion and marketing service. The contract builder module 118 may convert a sales proposal into an offered promotion, allowing consumers to purchase units of the promotion by accessing the promotion and marketing service.

Collectively, functionality provided by the promotional system 100 such as by the components described above, may be provided via the sales management module 120. A sales resource may user a sales resource device 130, such as a computer or mobile device, to access the sales management module 120. The sales management module 120, in some embodiments, may serve as a provider facing interface, allowing a sales resource to view data such as proposed promotion parameters entered on the promotion al system 100 by a provider.

Figure 2A:
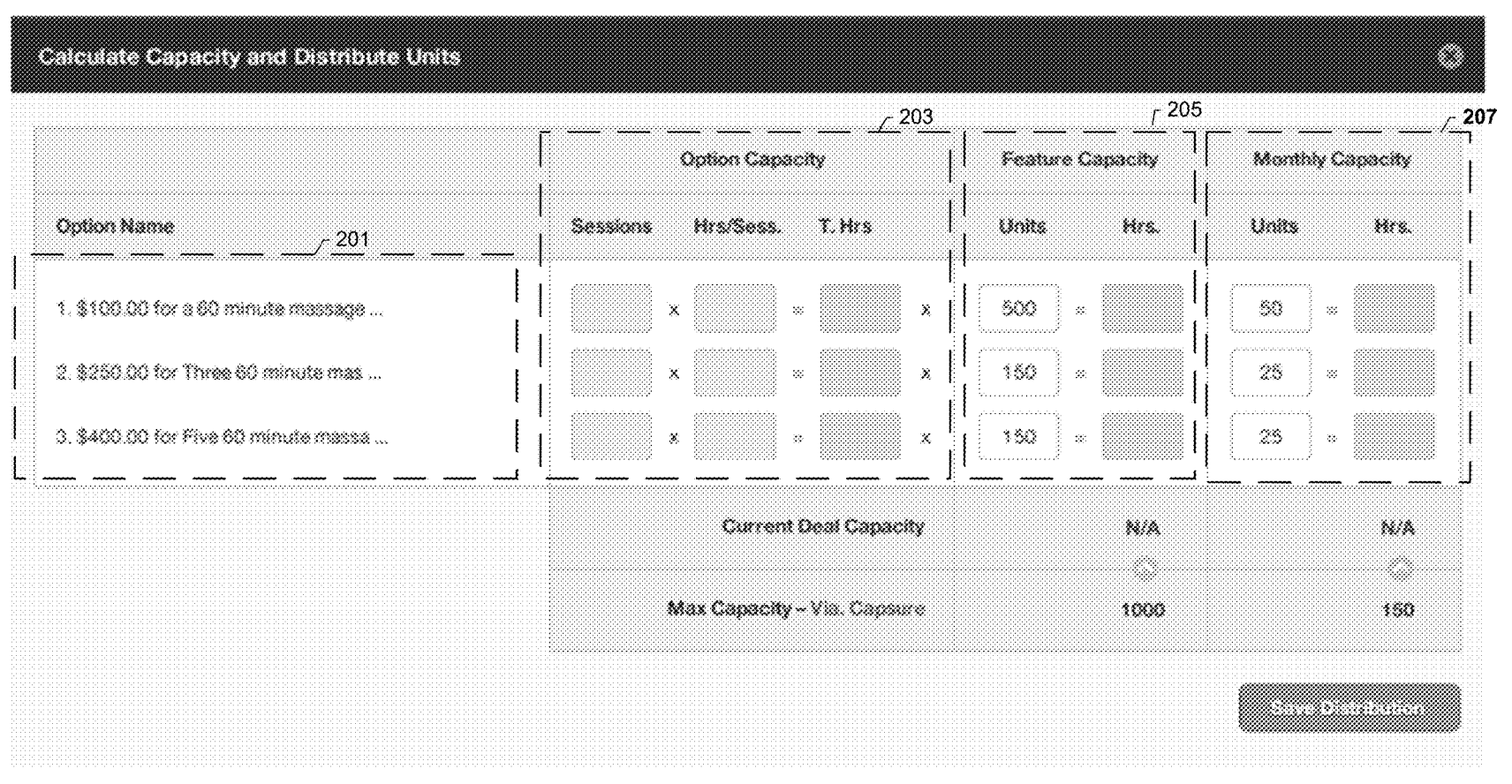
Figure 2B:
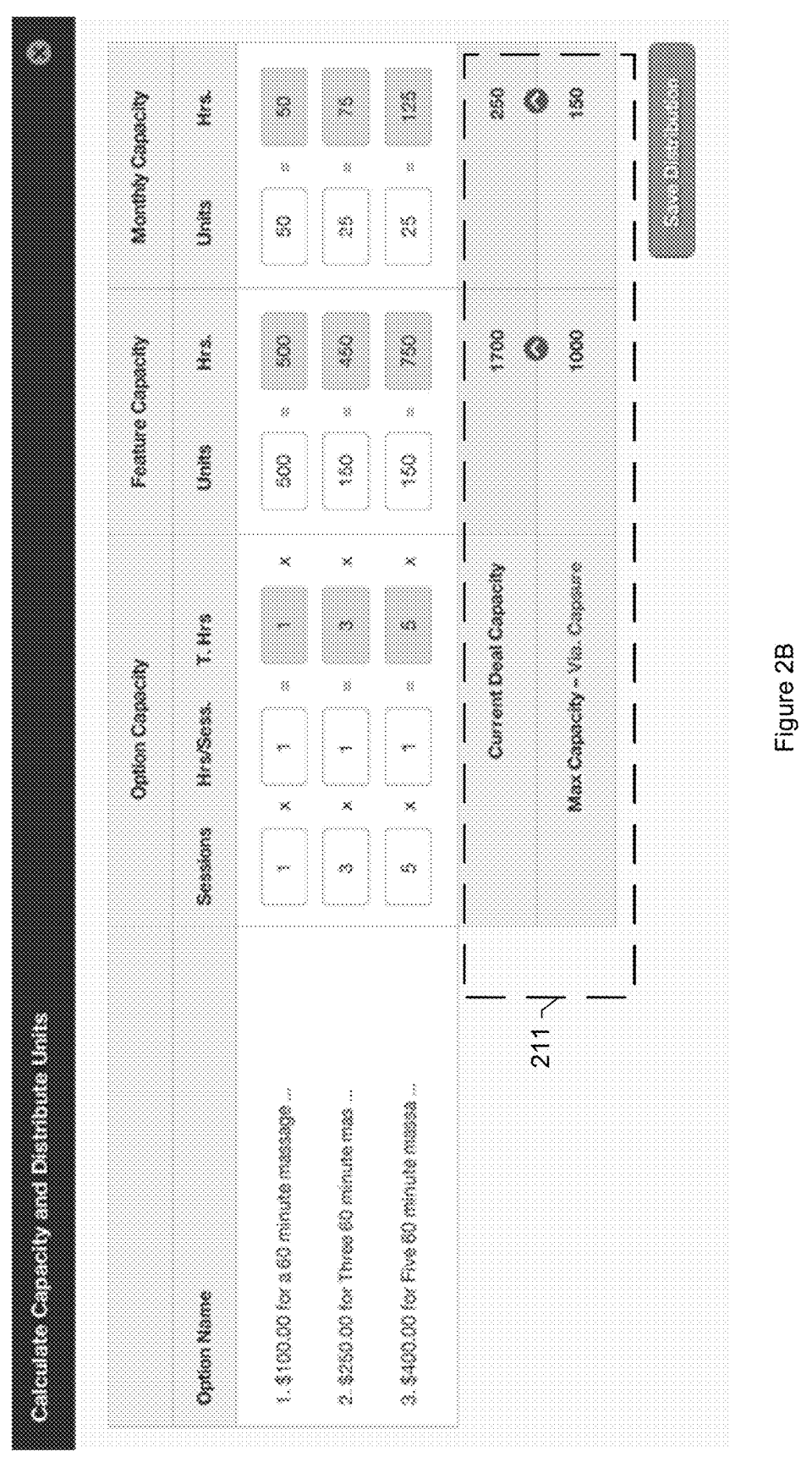
Figure 2C:
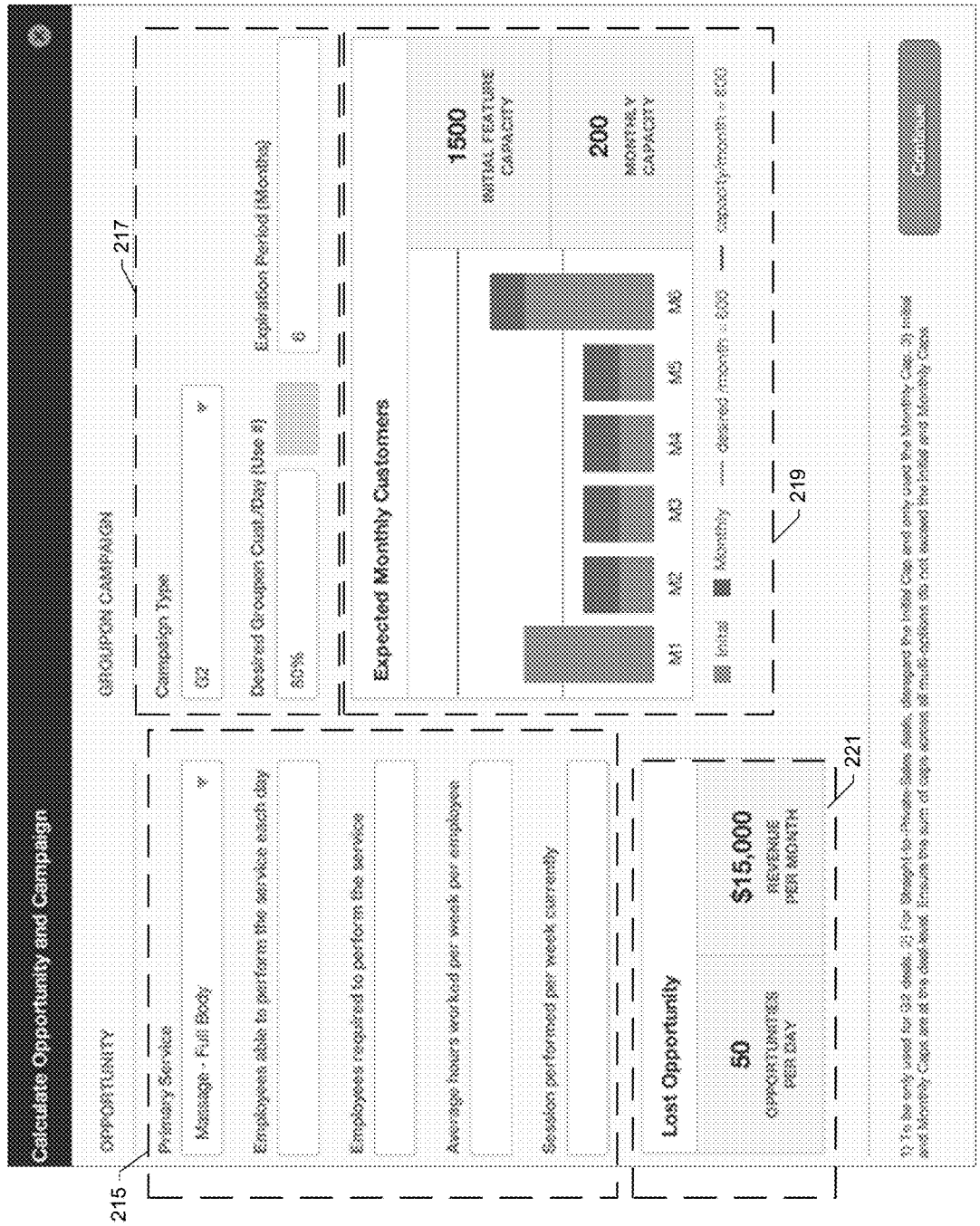
FIGS. 2A-2P are example screen displays according to example embodiments described herein.

FIGS. 2A-2D are example displays, or portions thereof, that may be provided by the sales management module 120. FIG. 2A is a display provided by the sales management module 120 for calculating capacity and distributing the availability of units of the promotion for purchase by month, by week, by day or the like. Some values may be prefilled based on data provided by the promotion structure module 110, based on information provided by the provider, such as services offered and/or the like. For example, area 201 provides the name of various promotions associated with a selected provider. Area 203 allows a sales resource and/or provider to enter the number of sessions in a given promotion, the number of hours needed by the provider to provide the service and/or the like. A maximum available total number of hours per promotion is then calculated, such as by the capacity module 108. In area 205, the number of units (or the number of vouchers) available per feature (e.g., promotion) may be prefilled by the promotion structure module 110 based on known provider information, for example. The quantity of units may otherwise be modified. A total number of hours needed to fulfill the total number of available promotions may then be calculated, based on a calculation of total hours per promotion times the number of units sold or for sale. The sales resource may then provide or otherwise modify, in area 207, a number of units of each promotion to offer each month. The capacity module 108 may then calculate a total number of hours of service needed per month by a provider to fulfill the promotions to be offered. Thus, in some examples, the number of promotions to be offered may be adjusted based on a determined capacity of the provider (e.g., to ensure that the provider has the capacity to handle the volume of redemptions expected as a result of the promotion). This information may be subsequently provided to the provider via the provider facing interface and/or sales management module 120.

FIG. 2B is an updated view of the display of FIG. 2A with fields populated. In area 211, the capacity module 108 provides the total number of hours required for the feature promotion and per month (current promotion capacity) and provides the maximum capacity for the feature promotion and per month, as calculated by the capacity module 108 and provided in area 219 of the display of FIG. 2C, for example. In this example embodiment, current promotion capacities (hours of service provided to fulfill the redemptions) greater than the maximum capacities may indicate to the sales resource that the allotted number of units should be reduced so as not to set the provider up to have an influx of consumers the provider cannot handle.

In instances in which an existing proposal is being edited or viewed, any of the fields of the display of FIG. 2C may be prefilled based on known or otherwise determined provider details. Area 215 may include fields such as primary services (e.g., category of product, experience, good or service offered by the provider), employees able to perform the service each day, employees required to perform the service, average hours worked per week per employee, and/or session performed per week currently. Selection of a primary service may cause some fields to be hidden and/or may cause the display of additional fields. For example, in some embodiments, such as when the service selected or prefilled is "food or drink," area 215 may include additional or alternative input fields such as an average check amount (e.g., average check per consumer or per party), peak daily customers (e.g., the most consumers at one given time at the provider), average daily customers, and/or days open per week (e.g., the number of days per week the provider is open, and/or a selection of days during the week the provider is open). Selection of other types of primary services may result in other or additional fields being provided in area 215.

Data may be input to the fields of area 215 by a sales resource having a phone conversation with a provider, by the provider, based on data derived from third party sources about the provider and/or the like. The capacity module 108 may perform various calculations with the data to determine a capacity of the provider for additional business, clientele, and/or the like. In some examples, by calculating capacity, the promotion or marketing service may meter or otherwise limit the quantity of promotions being offered by the provider so as to not exceed the providers capacity.

In area 217, a sales resource may enter and/or edit a campaign type, desired use of promotion/day (e.g., a target percent or number of consumers per day who are redeeming a promotional instrument) and an expiration period, such as in months, for the promotion. Areas 219 and/or 221 may populate based on calculation performed by the capacity module 108, as described herein, for example. Area 219 provides a hypothesized or otherwise estimated distributions of consumers by month based on the entered expiration period, the initial feature capacity (e.g., number of promotion units made available at the start of the promotion, for example), and a monthly capacity (e.g., number of consumers and/or service appointments the provider can accommodate per month). Area 221 provides estimates for lost opportunity, including a missed number of consumers per day, and a total estimate of lost revenue per month that the promotion is not offered. A sales resource may therefore provide any of the information on the display of FIG. 2C to a provider considering entering into an agreement with the promotion and marketing service to offer a promotion. In some embodiments, a sales resource may modify promotion parameters or other data and provide the updated information included in areas 219 and/or 221 to the provider. Some portions of FIG. 2C may update based on entry of other information collected with respect to FIGS. 2A-2P.

Figure 2D:

FIG. 2D provides for entry of a description of the good or service to be offered in the promotion, such as in entry field 262. In some examples, the description may be generated by an editorial content generator, fine print builder and/or the like. For example, certain text or images may be chosen based on the good or service selected. The value of the promotion may also be provided in input 227. In some embodiments, the promotion structures may be automatically generated by promotion structure module 110 and prefilled, as also prefilled in the capacity calculator of FIGS. 2A and 2B, based on information collected regarding the provider.

Indicator 229 may allow a sales resource to add an additional item to the promotion. For example, the multi-item or multi-option promotion may allow for a salon to package a promotion to include a haircut and manicure each having different values, for example.

In some embodiments, a plurality of options may be offered as part of the promotion, each option having a respective quantity and value. The total value of the items may be populated in area 231. In some embodiments, the provider selects on or more promotion options from promotion structures to include in a promotion.

Figure 2E:

FIG. 2E is another example view of the itemization display of FIG. 2D. A sales resource may enter a voucher number (e.g., number of goods or services offered in a multi-voucher or multi-option promotion) in area 233. In response, the ability to add another item to the promotion itemization may be disabled as shown by indicator 235.

Figure 2F:
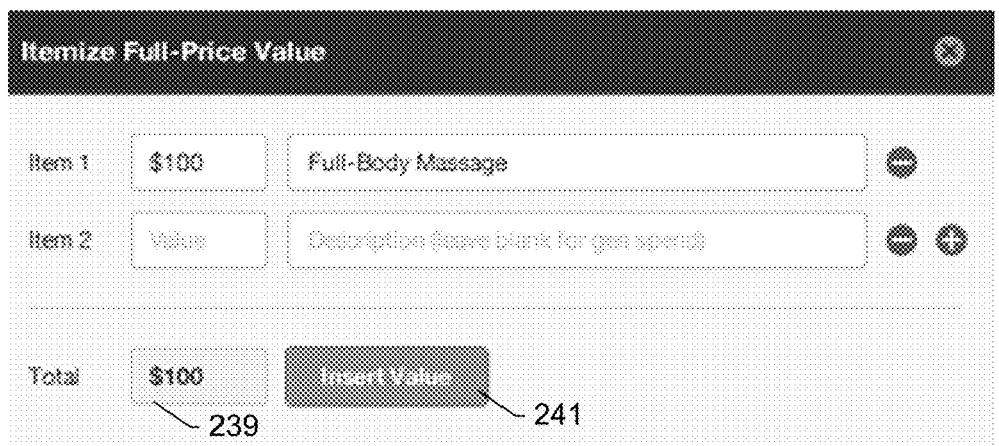

Enabling multi-voucher support with checkbox 237 may result in an update to the itemization display, such as provided in FIG. 2F. As such, in some examples, each promotion may have multiple promotion options whereas other example promotions may have a single promotion option.

In FIG. 2F, a sales resource may add multiple items and values. The total 239 is updated accordingly. Button 241 may allow the sales resource to insert the total value of the promotion to the ROI display such as that of FIG. 2I described in further detail hereinafter.

Figure 2G:
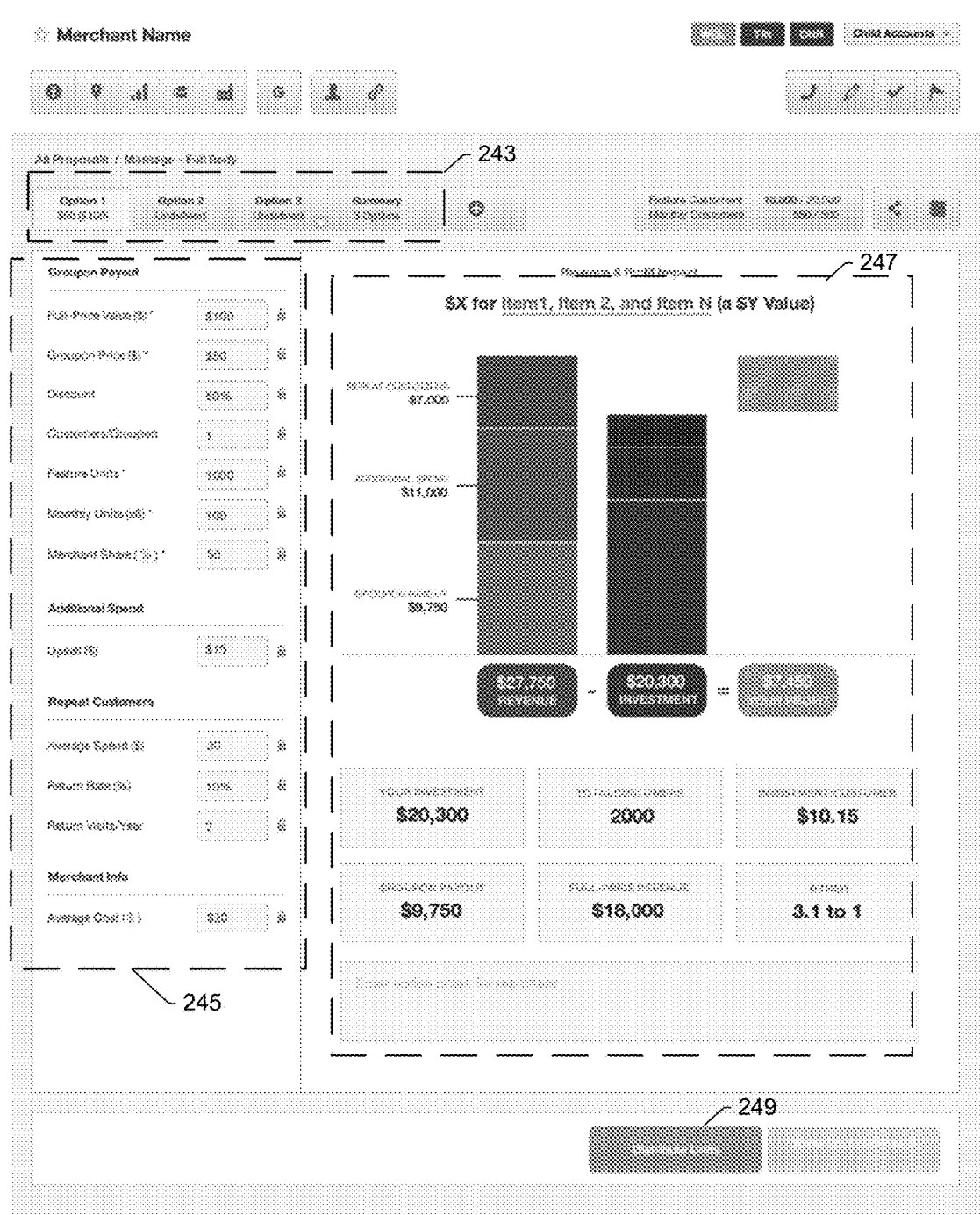

FIG. 2G provides ROI calculations for any of the proposals associated with a provider, such as selected in the provider list, such as the provider list of FIG. 2A. Area 243 provides for selection of any of the proposals as provided by promotion builder 114, for example. In some embodiments, area 243 may provide a summary tab which would provide total amounts of the promotion parameters or areas 245 and summarize or total amounts for the ROI information 247. Upon selection of a proposal, areas 245 and/or 247 may populate, such as with values calculated by the ROI module 112, and/or promotion builder 114. Any of the fields of area 245, associated with promotion parameters, may be pre-filled, or a sales resource may enter data into the fields as it is learned from the provider, the data may be derived from past interactions, from a third party or the like. Fields in area 245 may include, but are not limited to, the full price value of a promotion value, cost, percentage of discount, number of visits generated per promotion, feature units (e.g., total number of units made available), monthly units available, and provider share (e.g., provider margin). The additional spend and/or upsell amount may be the average amount spent above the promotion value when a consumer visits the provider to redeem the promotion. Income generated based on repeat customers may also be entered, such as an estimated average spend per consumer, rate of return (e.g., percentage of consumer who return), average number of visit per year. The average cost to the provider may also be provided. The ROI module 112 may process any of the data provided into the fields of area 245 to generate the ROI information provided in area 247. Selection of button 249 may result in a transition to a display such as that of FIG. 2A for configuring or reconfiguring distribution according to capacity.

Figure 2H:
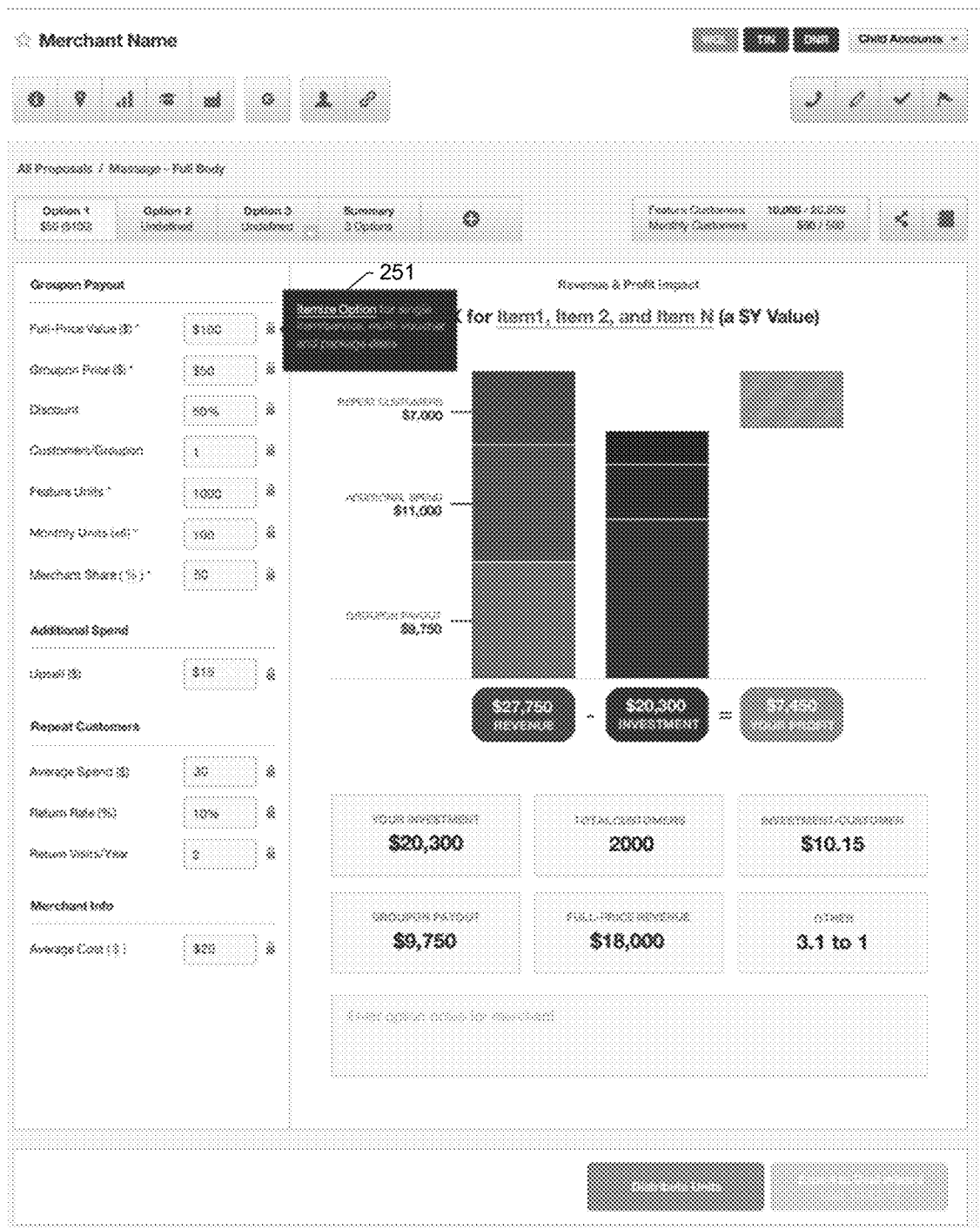

FIG. 2H is another view of the display of FIG. 2G, according to an example embodiment. As indicated in area 251, an option is provided to itemize services, or individual promotion options, examples of which are provided below, to be included in the promotion. Selection of the "itemize option" link may result in a display such as any of FIGS. 2D, 2E, and/or 2F, for example, for modifying the promotion structures.

Figure 2I:
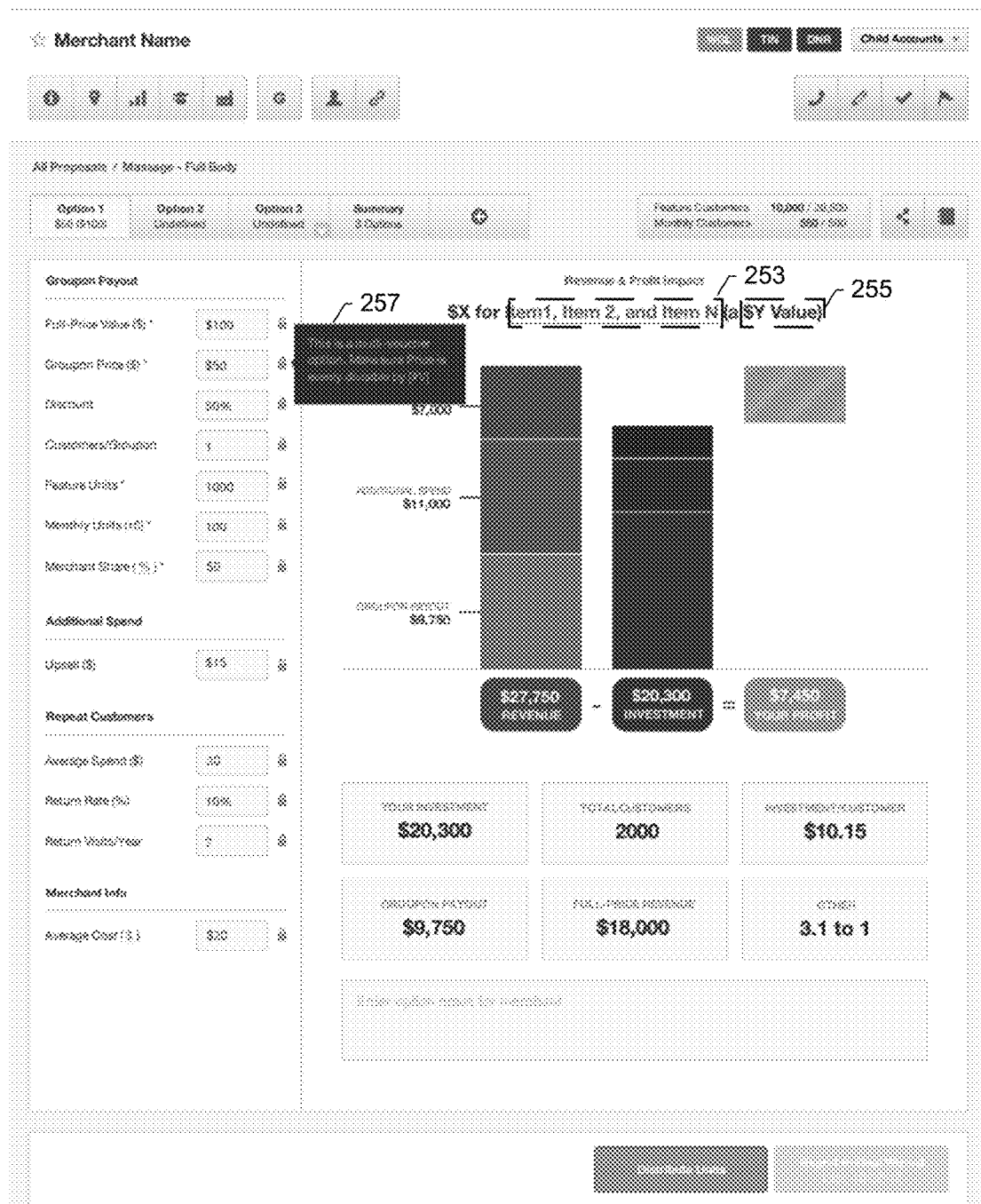

FIG. 2I is yet another example display of the ROI calculations for a selected proposed promotion. The entered items in any of input fields 225 and/or 233 may be populated in area 253, and the total value 231 and/or 239 may be populated in area 255. The ROI information may be recalculated by the ROI module 112 accordingly. As indicated in area 257, the display indicates, "This is a multi-voucher option. Make sure Price evenly divisible by #V." This comment assists the sales resource in dividing the total price evenly among vouchers in a multi-voucher promotion. For example, for a promotion offering 3 massages for $100, promotional system 100 may not be able to divide $100 into 3 equally priced vouchers. The comment encourages the sales resource and/or provider to offer the 3 massages for $99 so that each voucher has a value of $33.00. Alternatively or additionally, vouchers may be made divisible in unequal amounts.

Figure 2J:
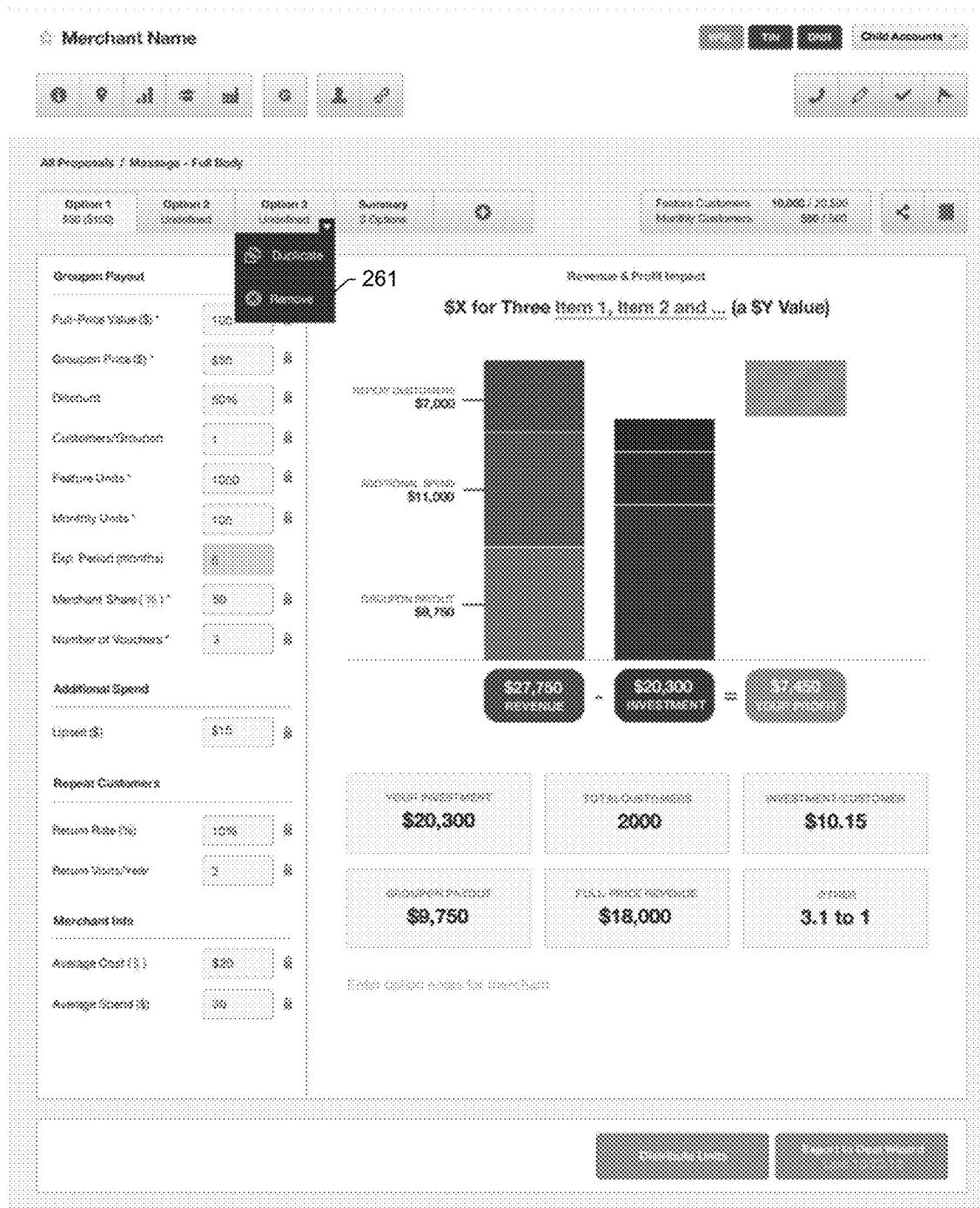

In FIG. 2J, selection menu 261 allows for duplication or removal of a proposed promotion. Duplicating a proposed promotion may allow a sales resource to save one version of a proposal while tweaking one or more fields in a new duplicated version of the proposal to analyze how potential changes to the promotion parameters may impact the ROI, for example. As such, some examples of the embodiments described herein, allow for the sales resource to provide one or more options to the provider along with a calculated ROI for each option.

In some embodiments, proposal(s) may be exported or otherwise integrated with a deal wizard application. Example displays of the deal wizard application are provided in FIGS. 2K-2N.

Figure 2K:
Figure 2L:
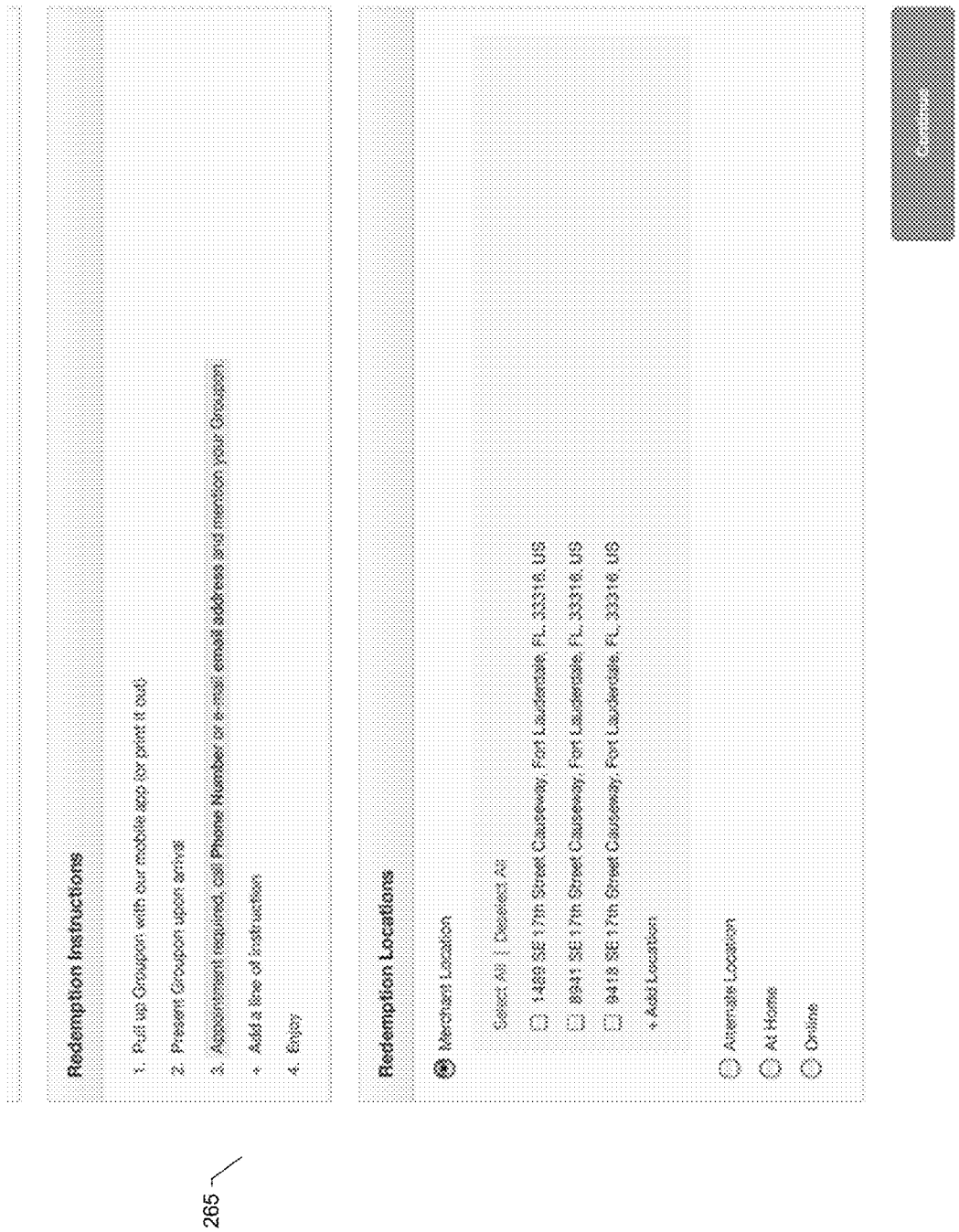

FIGS. 2K and 2L are displays generated by a deal wizard application, in some examples, to collect details 263 regarding the proposal. The details 263 of FIG. 2K include any pertinent information that may need to be collected before generating the promotion. Fine print clauses may be separated according to their relevance. For instance, required fine print (identified using either default rules retrieved from corresponding fields of the fine print clause data structure, or using rules retrieved in a mapping data structure and received from the promotional system 100 may be presented first, followed by recommended fine print (fine print that, by rule, is shown and may also be preselected for inclusion in the fine print string), followed by a button corresponding to all relevant fine print that is not shown by rule to the user, but which may become visible after selection of the button. Details 263 include further information that may be provided and/or edited, such as expiration date information (e.g., relative to a feature, relative to a purchase, and/or for a fixed period). Details 263 may also include configuration information such as a division or sales, and indicators for a 'private sale,' 'mulligans,' and/or 'custom checkout required,' and customize option order. The display of FIG. 2K also allows a user to re-order the promotion options as they will appear to a consumer.

The display of FIG. 2L includes additional redemption details 265 or redemption parameters including "Redemption Instructions," into which a sales resource may insert ad hoc additional fine print that might not be presented to the user initially. The redemption instructions field ensures flexibility of the fine print generation process, as the sales resource retains the option to manually enter any additional fine print clauses. Finally, the currently selected redemption locations are provided, enabling a user to designate a new location at which redemption will be enabled.

Alternatively or additionally, in some examples, a display may include one or more drop down boxes or other types of list boxes that contain fine print clauses that relate to certain messages that would be included in the fine print of the promotion. For example, in an Italian restaurant promotion, a first box may contain a listing of quantity clauses (e.g., limit one per person; limit one per person, may buy one as a gift, etc.) and a second box containing a list of dining option clauses (e.g., dine in, take out or dine in/take out). Other display methods may be used in other example embodiments.

Figure 2M:
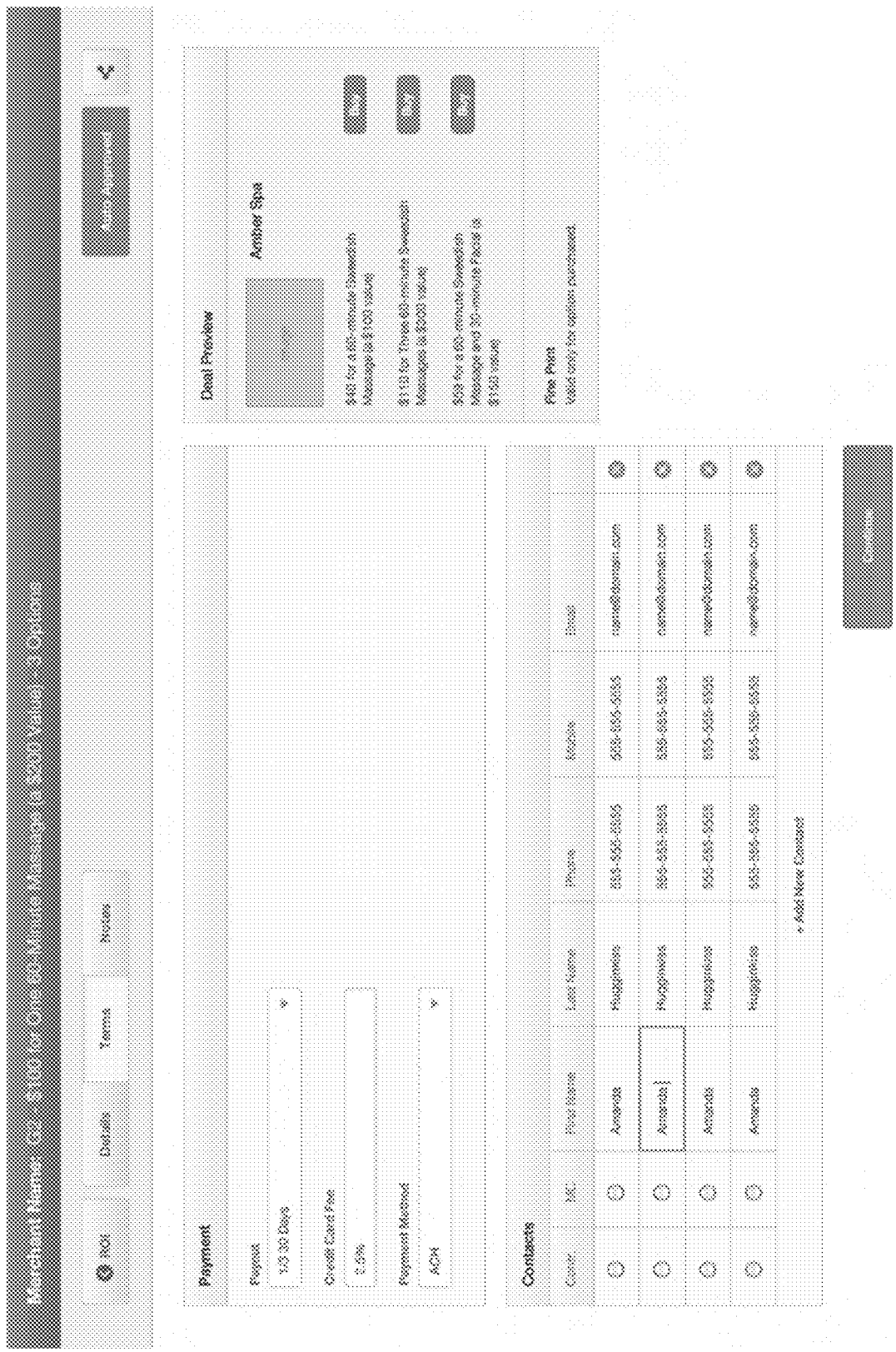
Figure 2N:
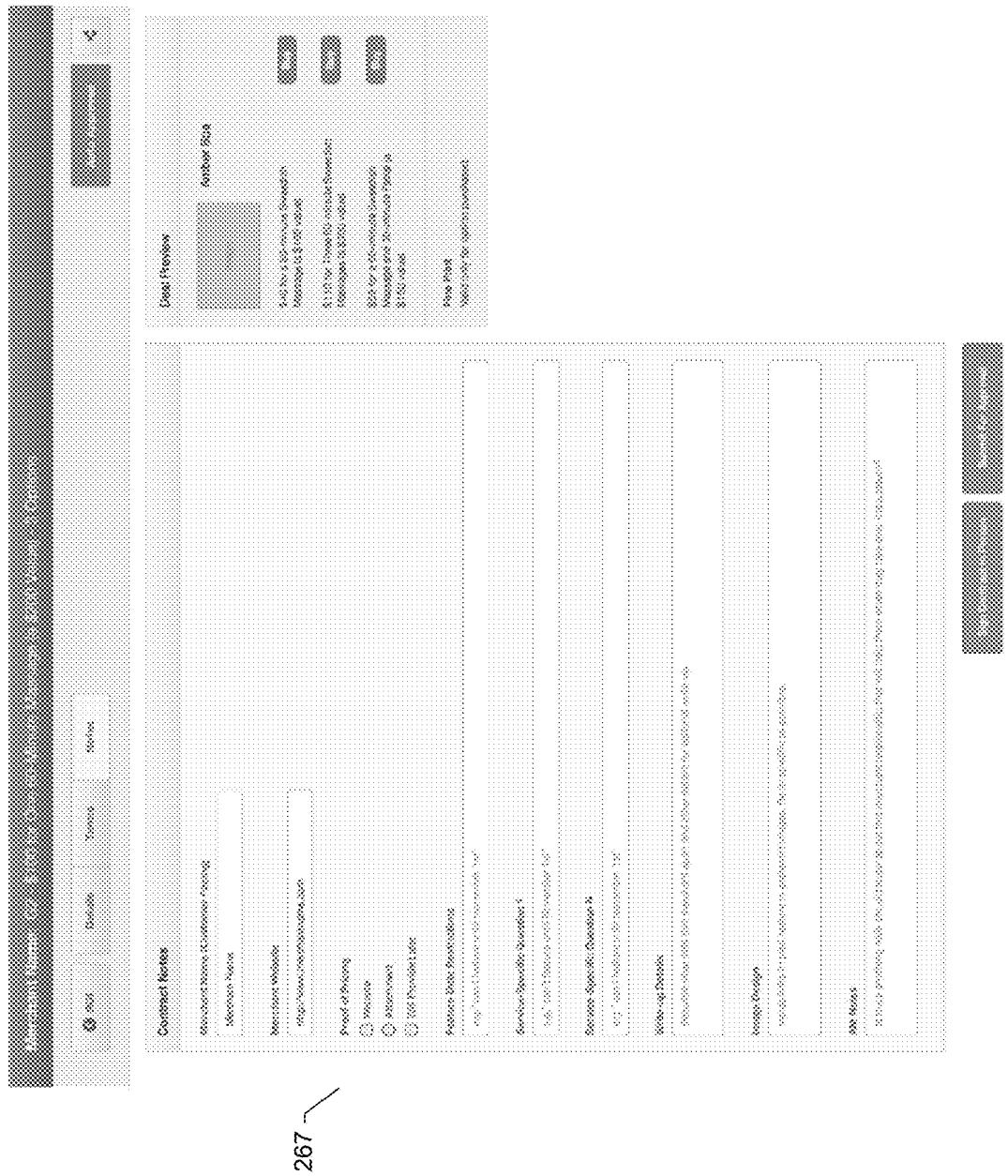

FIG. 2M is an example display of terms that may be entered by a sales resource prior to generating the promotion, such as payment details, and contact information. FIG.

2N allows a sales resource to provide additional notes 267 regarding the contract with the provider to offer the promotion.

Figure 2O:
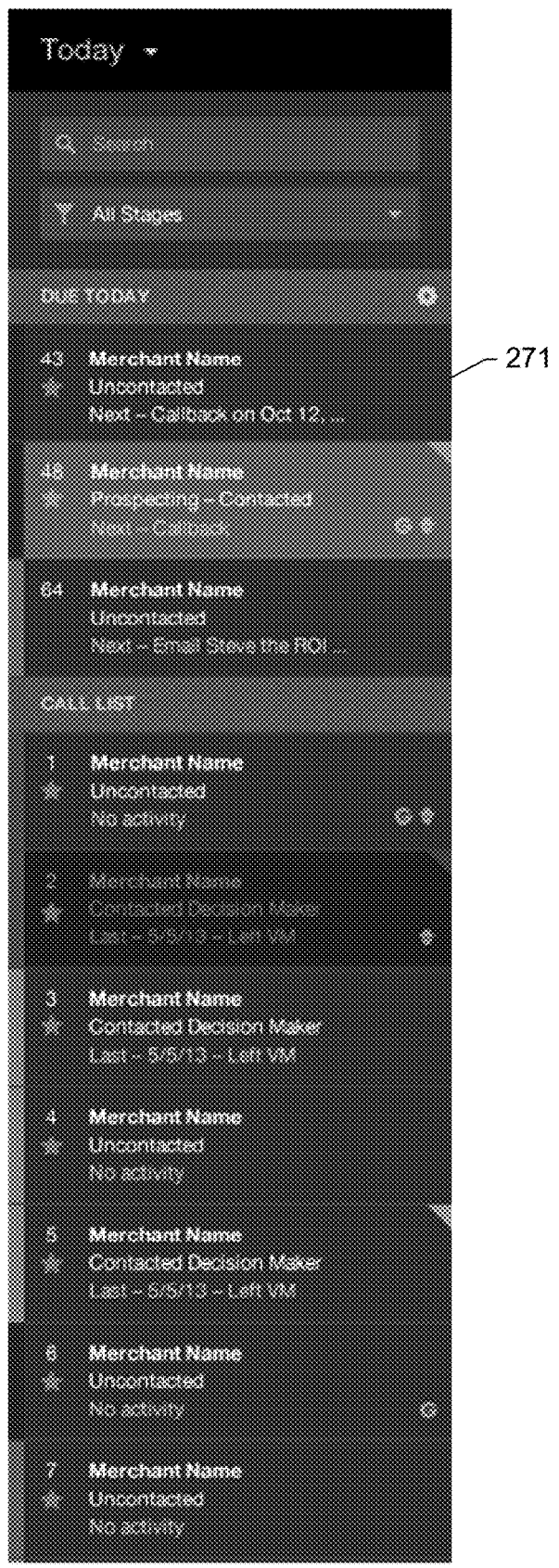

In some embodiments, a sales resource using the promotional system 100 may find it beneficial to view information specific to the provider. Such as for contacting the provider to discuss the proposed promotion, to verify provider information, and/or the like. The display of FIG. 2O provides a list of providers 271 and/or sales leads assigned to a specific sales resource for follow-up. The list of providers may be sorted by priority. The provider list may be anchored to the sidebar of any display provided by the sales management module 120, so that the sales resource may have a view of open tasks and deadlines, while utilizing other functionality of the sales management module 120, as described above. The information provided may include details regarding a last contact date and time. Upon selection of a provider in the list of providers 200, a main display area or other display provided herein may be updated to reflect proposed promotions associated with the selected provider.

Figure 2P:
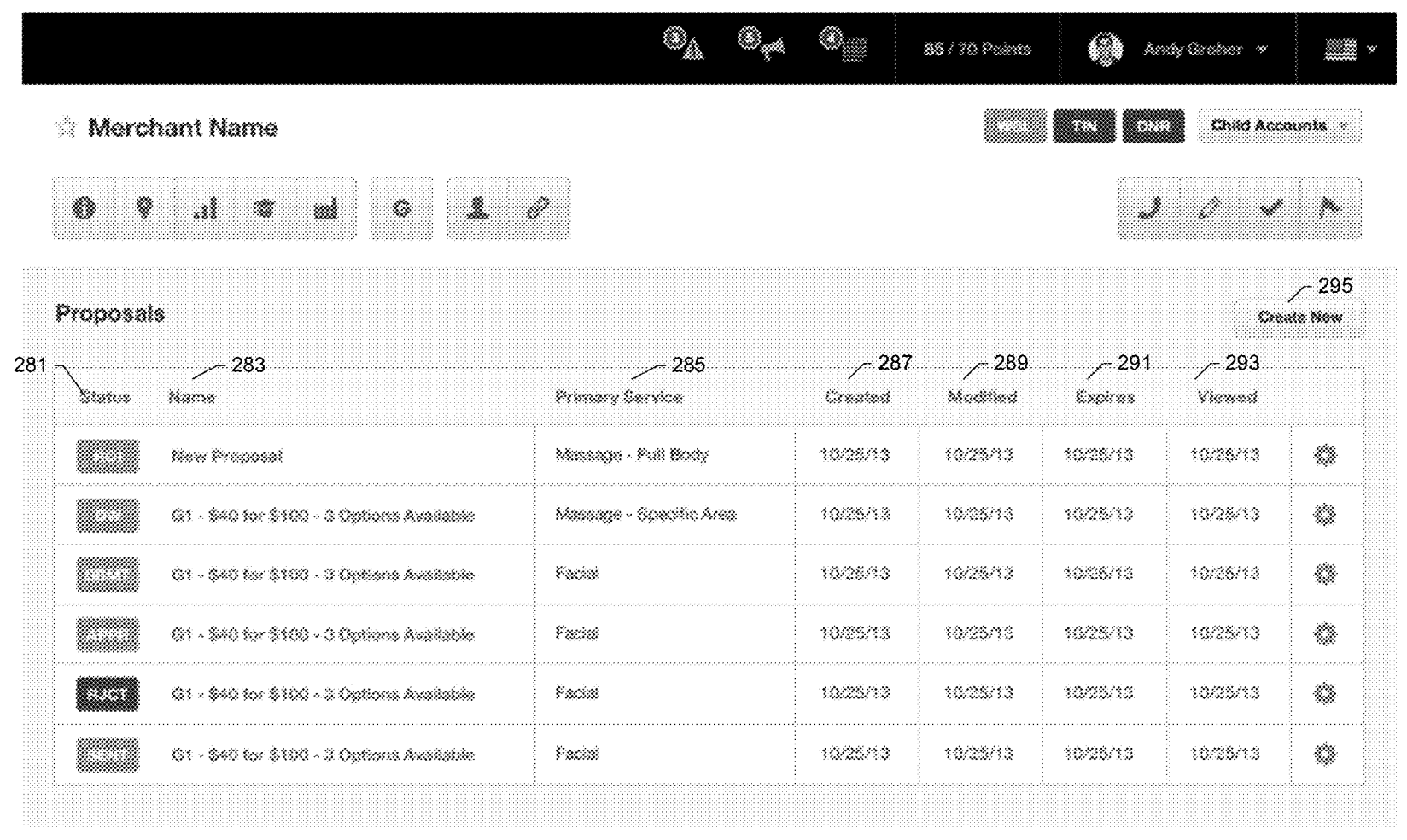

For example, the display of FIG. 2P provides promotion sales proposals associated with a selected provider. The promotion builder 114 may provide functionality to store, access, and edit promotion proposals, and/or provide a user interface such as the display of FIG. 2P with which a user views and/or edits proposals. The proposals may be created and saved by the sales resources, or otherwise generated by the promotional system 100, such as based on demand for a promotion and/or capacity of the provider. A proposal may have a status 281 of ROI (e.g., indicating ROI is to be calculated and/or otherwise displayed), DW (deal wizard or promotion wizard—the proposal is awaiting further detail before sending to the provider, described herein with respect to FIGS. 2K-2N), SBMT (submitted to provider), APPR (approved by provider), RJCT (rejected by provider), and/or SENT (sent to provider, awaiting response), for example. The proposal list may also include a name 283, primary service 285 to be offered via the proposed promotion, date created 287, date modified 289, expiration date 291, and date last viewed 293. A user may select to create a new proposal with a 'create new' button 295. A user may select any of the displayed proposals to edit. Selecting to edit a proposal or to create a new proposal will result in the sales management module 120 providing a display, such as the display of FIG. 2C so that the promotion parameters may be edited.

The promotion parameters and redemption parameters of a proposed promotion may be entered by a sales resource, remotely from the provider, such as with a provider facing interface implemented on the sales management module 120, for example. Once the necessary information is entered, the proposed promotion information may be accessed by the provider via the provider facing interface for approval. A provider may modify any of the information collected with respect to FIGS. 2A-2P. In some embodiments, any number of iterations may occur to enable the sales resource and provider to collaborate such that an optimal promotion is proposed for both the sales resource and the provider. Following approval by the provider, or auto-approval by the auto-approval module 116, the promotion may be generated and the units may be made available for sale on the promotional system 100.

Figure 3:
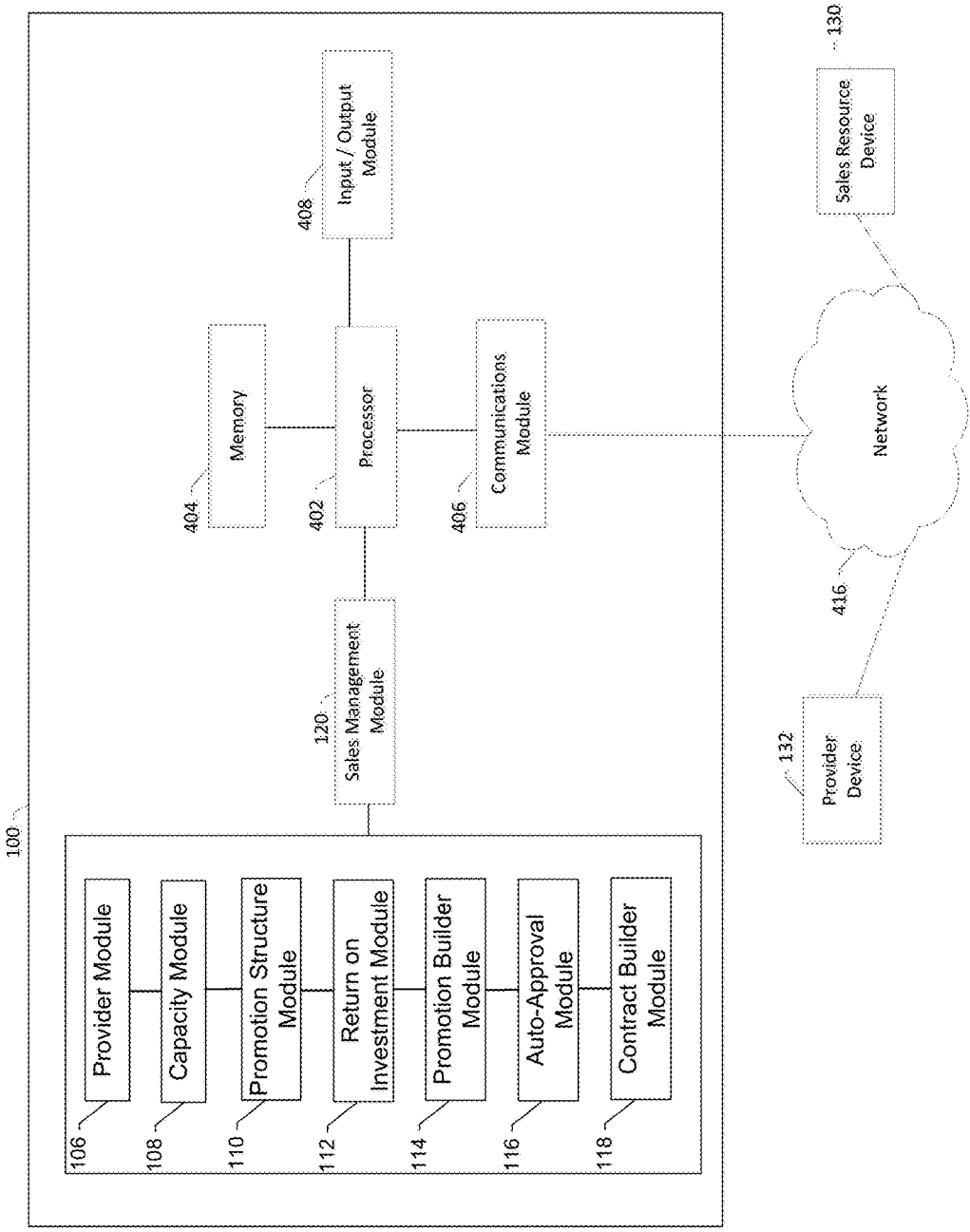
FIG. 3 is a schematic block diagram of a promotional system in accordance with an example embodiment.

Having now described example displays provided by the sales management module 120, FIG. 3 provides an implementation of promotional system 100 according to an example embodiment.

In accordance with some example embodiments, promotional system 100 may include various means, such as one or more processors 402, memories 404, communications modules 406, and/or input/output modules 408. A promotional system 100 may further include sales management module 120, provider module 106, capacity module 108, promotion structure 110, ROI module 112, promotion builder 114, auto-approval module 116, and/or contract builder 118, among other things (not shown). As referred to herein, the term "module" includes hardware, software and/or firmware configured to perform one or more particular functions. In this regard, promotional system 100 as described herein may be embodied as, for example, circuitry, hardware elements (e.g., a suitably programmed processor, combinational logic circuit, and/or the like), a computer program product comprising computer-readable program instructions stored on a non-transitory computer-readable medium (e.g., memory 404) that is executable by a suitably configured processing device (e.g., processor 402), or some combination thereof.

Processor 402 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 3 as a single processor, in some embodiments, processor 402 comprises a plurality of processors. The plurality of processors may be embodied on a single computing device or may be distributed across a plurality of computing devices collectively configured to function as promotional system 100. The plurality of processors may be in operative communication with each other and may be collectively configured to perform one or more functionalities of promotional system 100 as described herein. In an example embodiment, processor 402 is configured to execute instructions stored in memory 404 or otherwise accessible to processor 402. These instructions, when executed by processor 402, may cause promotional system 100 to perform one or more of the functionalities of promotional system 100 as described herein.

Whether configured by hardware, firmware/software methods, or by a combination thereof, processor 402 may comprise an entity capable of performing operations according to embodiments of the present invention while configured accordingly. Thus, for example, when processor 402 is embodied as an ASIC, FPGA or the like, processor 402 may comprise specifically configured hardware for conducting one or more operations described herein. As another example, when processor 402 is embodied as an executor of instructions, such as may be stored in memory 404, the instructions may specifically configure processor 402 to perform one or more operations described herein, such as those discussed in connection with FIG. 5 below.

Memory 404 may comprise, for example, volatile memory, non-volatile memory, or some combination thereof. Although illustrated in FIG. 3 as a single memory, memory 404 may comprise a plurality of memory components. The plurality of memory components may be embodied on a single computing device or distributed across a plurality of computing devices. In various embodiments, memory 404 may comprise, for example, a hard disk, random access memory, cache memory, flash memory, a compact disc read only memory (CD-ROM), digital versatile disc read only memory (DVD-ROM), an optical disc, circuitry configured to store information, or some combination thereof. In some embodiments, memory 404 may comprise a suitable network database (e.g., provider database 104 and/or consumer database 102) configured to store demand information, promotion data, and/or provider information as described herein. Additionally or alternatively memory 404 may be configured to store such data as well as various applications, instructions, or the like for enabling promotional system 100 to carry out various functions in accordance with example embodiments of the present invention. For example, in at least some embodiments, memory 404 is configured to buffer input data for processing by processor 402. Additionally or alternatively, memory 404 may be configured to store program instructions for execution by processor 402. Memory 404 may store information in the form of static and/or dynamic information. This stored information may be stored and/or used by promotional system 100 during the course of performing its functionalities.

Communications module 406 may be embodied as any device or means embodied in circuitry, hardware, a computer program product comprising computer readable program instructions stored on a computer readable medium (e.g., memory 404) and executed by a processing device (e.g., processor 402), or a combination thereof that is configured to receive and/or transmit data from/to another device, such as, for example, a second promotional system 100 and/or the like. In some embodiments, communications module 406 (like other components discussed herein) can be at least partially embodied as or otherwise controlled by processor 402. In this regard, communications module 406 may be in communication with processor 402, such as via a bus. Communications module 406 may include, for example, an antenna, a transmitter, a receiver, a transceiver, network interface card and/or supporting hardware and/or firmware/software for enabling communications with another computing device. Communications module 406 may be configured to receive and/or transmit any data that may be stored by memory 404 using any protocol that may be used for communications between computing devices, such as between the promotional system 100 and a sales resource device 130. Communications module 406 may additionally or alternatively be in communication with the memory 404, input/output module 408 and/or any other component of promotional system 100, such as via a bus.

Input/output module 408 may be in communication with processor 402 to receive an indication of a user input and/or to provide an audible, visual, mechanical, or other output to a user (e.g., provider and/or consumer). As such, input/output module 408 may include support, for example, for a keyboard, a mouse, a joystick, a display, a touch screen display, a microphone, a speaker, a RFID reader, barcode reader, biometric scanner, and/or other input/output mechanisms. In embodiments wherein promotional system 100 is embodied as a server or database, aspects of input/output module 408 may be reduced as compared to embodiments where promotional system 100 is implemented as an end-user machine (e.g., sales resource device 130, and/or provider device 132) or other type of device designed for complex user interactions. In some embodiments (like other components discussed herein), input/output module 408 may even be eliminated from promotional system 100. Alternatively, such as in embodiments wherein promotional system 100 is embodied as a server or database, at least some aspects of input/output module 408 may be embodied on an apparatus used by a user that is in communication with promotional system 100, such as for example, sales resource device 130. Input/output module 408 may be in communication with the memory 404, communications module 406, and/or any other component(s), such as via a bus. Although more than one input/output module and/or other component can be included in promotional system 100, only one is shown in FIG. 3 to avoid overcomplicating the drawing (like the other components discussed herein).

Sales management module 120 may integrate the functionality of modules 106, 108, 110, 112, 114, 116, and/or 118, as described herein, to provide consolidated facilitation of sales to sales resources, and/or the like, as described herein and above with respect to FIG. 1. In some embodiments, some or all of the functionality of the modules may be performed by processor 402. For example, non-transitory computer readable storage media can be configured to store firmware, one or more application programs, and/or other software, which include instructions and other computer-readable program code portions that can be executed to control each processor (e.g., processor 402 and/or any of the modules 106, 108, 110, 112, 114, 116, 118 and/or 120) of the promotional system 100 to implement various operations. As such, a series of computer-readable program code portions are embodied in one or more computer program products and can be used, with a computing device, server, and/or other programmable apparatus, to produce machine-implemented processes.

Promotional system 100 may be coupled to one or more sales resources devices 130 via network 416. In this regard, network 416 may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, network 416 may include a cellular telephone, an 802.11, 802.16, 802.20, and/or WiMax network. Further, the network 416 may include a public network, such as the Internet, a private network, such as an intranet, or combinations thereof, and may utilize a variety of networking protocols now available or later developed including, such as, but not limited to, TCP/IP based networking protocols.

Any number of sales resource devices 130 may be implemented as a personal computer and/or other networked device, such as a cellular phone, tablet computer, mobile device, etc., that may be used to access other components of promotional system. As such, a sales resource may use a sales resource device 130 to view example displays provided by the sales management module 120 such as those provided in FIGS. 2A-2P. In some embodiments, information regarding a proposed promotion may be transmitted from a sales resource device 130 to the promotional system 100, that may be used, for example to information in any of the modules 106, 108, 110, 112, 114, 116, 118 and/or 120.

Any number of provider devices 132 may be implemented as a personal computer and/or other networked device, such as a cellular phone, tablet computer, mobile device, etc., that may be used to access other components of promotional system 100. As such, a provider may use a provider device 132 to enter proposed promotion parameters and/or the like, and view corresponding ROI information. In some embodiments, information entered by a provider via a provider device 132 may be subsequently view and/or modified by a sales resource using a sales resource device 130 to the promotional system 100, that may be used, for example to information in any of the modules 106, 108, 110, 112, 114, 116, 118 and/or 120. The promotional system 100 may therefore promote collaboration among sales resources and providers to more efficiently devise a promotion benefiting both the promotion and marketing service and provider.

As will be appreciated, any such computer program instructions and/or other type of code may be loaded onto a computer, processor or other programmable apparatus circuitry to produce a machine, such that the computer, processor, or other programmable circuitry that executes the code on the machine creates the means for implementing various functions, including those described herein.

It is also noted that all or some of the information presented by the example displays discussed herein can be based on data that is received, generated and/or maintained by one or more components of promotional system 100. In some embodiments, one or more external systems (such as a remote cloud computing and/or data storage system) may also be leveraged to provide at least some of the functionality discussed herein.

Figure 4:
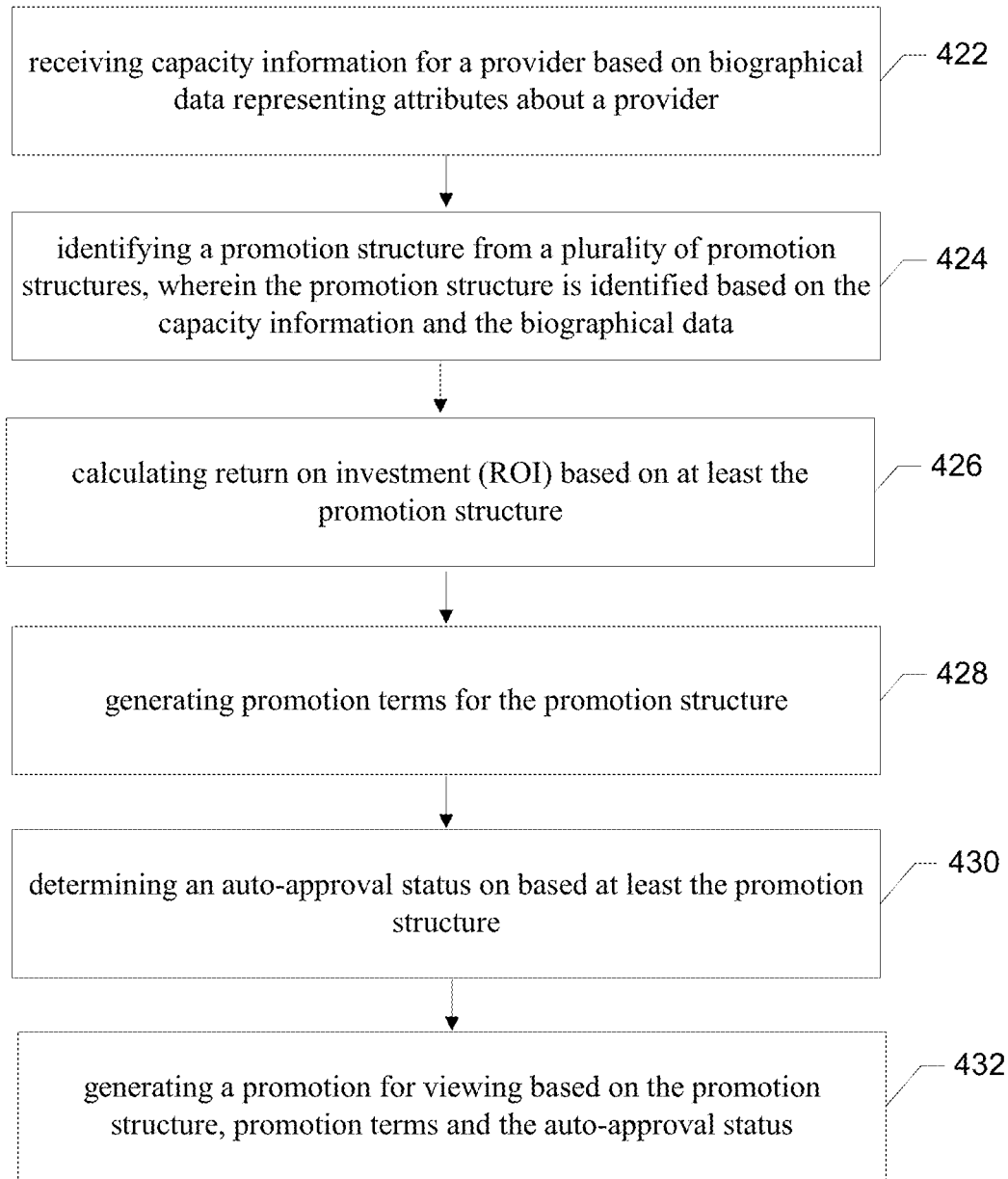
FIGS. 4 and 5 are flowcharts illustrating operations for providing management of sales proposals, according to example embodiments.

FIG. 4 illustrates an example process that may be performed by the promotional system 100 according to an example embodiment. As shown by operation 422, the promotional system 100 may include means, such as the capacity module 108, processor 402, sales management module 120, input/output module 408, memory 404 and/or the like, receiving capacity information for a provider based on biographical data representing attributes about a provider. Receiving capacity information is described in further detail with respect to the displays of FIGS. 2A and 2B, and also with respect to FIG. 6 below.

Continuing to operation 424, the promotional system 100 may include means, such as the deal structure module 110, processor 402, sales management module 120, input/output module 408, memory 404 and/or the like, for identifying a promotion structure from a plurality of promotion structures, wherein the promotion structure is identified based on the capacity information and the biographical data. Identifying a promotion structure is described in further detail with respect to the displays of FIGS. 2D, 2E, and 2F, and also with respect to FIG. 7 below.

Continuing to operation 426, the promotional system 100 may include means, such as the ROI module 112, processor 402, sales management module 120, memory 404 and/or the like, for calculating return on investment (ROI) based on at least the promotion structure. Calculating ROI is described in further detail with respect to the displays of FIGS. 2G, 2H, 2I, and 2J, and also with respect to FIGS. 8A, 8B, and 8C below.

Continuing to operation 428, the promotional system 100 may include means, such as the promotion builder module 114, processor 402, sales management module 120, memory 404 and/or the like, for generating promotion terms for the promotion structure. Generating promotion terms is described in further detail with respect to the displays of FIGS. 2K, 2L, 2M, and 2N, and also with respect to FIG. 9 below.

Continuing to operation 430, the promotional system 100 may include means, such as the auto-approval module 116, processor 402, sales management module 120, memory 404 and/or the like, for determining an auto-approval status on based at least the promotion structure. Determining an auto-approval status is described in further detail with respect to FIG. 10 below. In some embodiments, data collected in any of the operations 422, 424, 426, and/or 428, and/or provided with the use of the displays 2A-2P, may be analyzed by the auto-approval module 116 upon receiving such data, and a current auto-approval status based on the received data may be displayed on any of the displays of FIGS. 2A-2P. The auto-approval status may therefore be updated as additional information is received and/or updated.

Continuing to operation 432, the promotional system 100 may include means, such as the contract builder module 118, processor 402, sales management module 120, memory 404 and/or the like, for generating a promotion for viewing based on the promotion structure, promotion terms and the auto-approval status. In instances in which the promotion structure is auto-approved, as described above with respect to operation 430, the promotion may be generated and made available for viewing and/or for sale by the promotional system 100.

In some embodiments, contract documents may also be generated. For example, document templates may be stored on memory 404, and the terms of the promotion according to the promotion structure may be applied to an appropriate template so as to generate contract documents defining the arrangement between the provider and the promotion and marketing service to offer the promotion. In some embodiments, the provider may electronically sign the generated contract documents. In instances in which the promotion structure is auto-approved, as described above with respect to operation 430, signing of the contract documents may result in the promotion being made available for sale.

Figure 5:
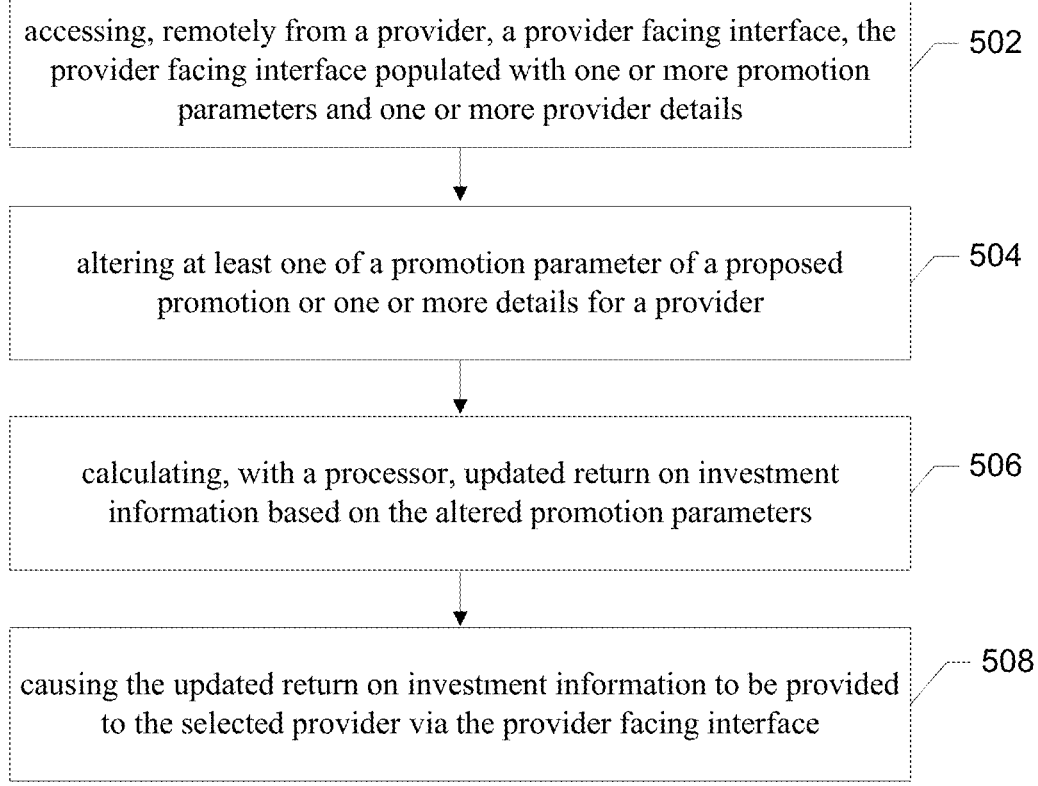

FIG. 5 illustrates an example process that may be performed by the promotional system 100 according to an example embodiment. As shown by operation 502, the promotional system 100 may include means, such as the processor 402, sales management module 120, input/output module 408, memory 404 and/or the like, for accessing, remotely from a provider, a provider facing interface, the provider facing interface populated with one or more promotion parameters and one or more provider details. The example displays of FIGS. 2A-2P may therefore be prefilled with any of the information. This information, in some embodiments, may be provided by a provider in a previous interaction with the provider facing interface. Any proposed promotion parameters, redemption parameters, or any other pertinent information provider may therefore by saved to memory 404, and retrieved subsequently by a sales resource accessing the provider facing interface.

In some embodiments, the promotion parameters may comprise a plurality of options to be offered as part of the promotion, each option having a respective quantity and value. As shown by operation 504, the promotional system 100 may include means, such as the processor 402, sales management module 120, input/output module 408, memory 404 and/or the like, for altering at least one of a promotion parameter of a proposed promotion or one or more details for a provider. As such, with use of any of the display of FIGS. 2A-2P, for example, a sales resource may provide or otherwise alter promotion parameters associated with a proposed promotion.

As shown by operation in 506, the promotional system 100 may include means, such as the processor 402, return on investment module 112, and/or the like, for calculating updated ROI information based on the altered promotion parameters. In this regard, any ROI information described herein and/or displayed on the displays of FIGS. 2G and 2H, for example, or described with respect to FIGS. 8A, 8B, and/or 8C may be updated based on the altered promotion parameters. In some embodiments, ROI information may be a summary of ROI based on at least two proposed promotions.

As shown by operation in 508, the promotional system 100 may include means, such as the processor 402, sales management module 120, input/output module 408 and/or the like, for causing the updated return on investment information to be provided to the selected provider via the provider facing interface.

Figure 6:
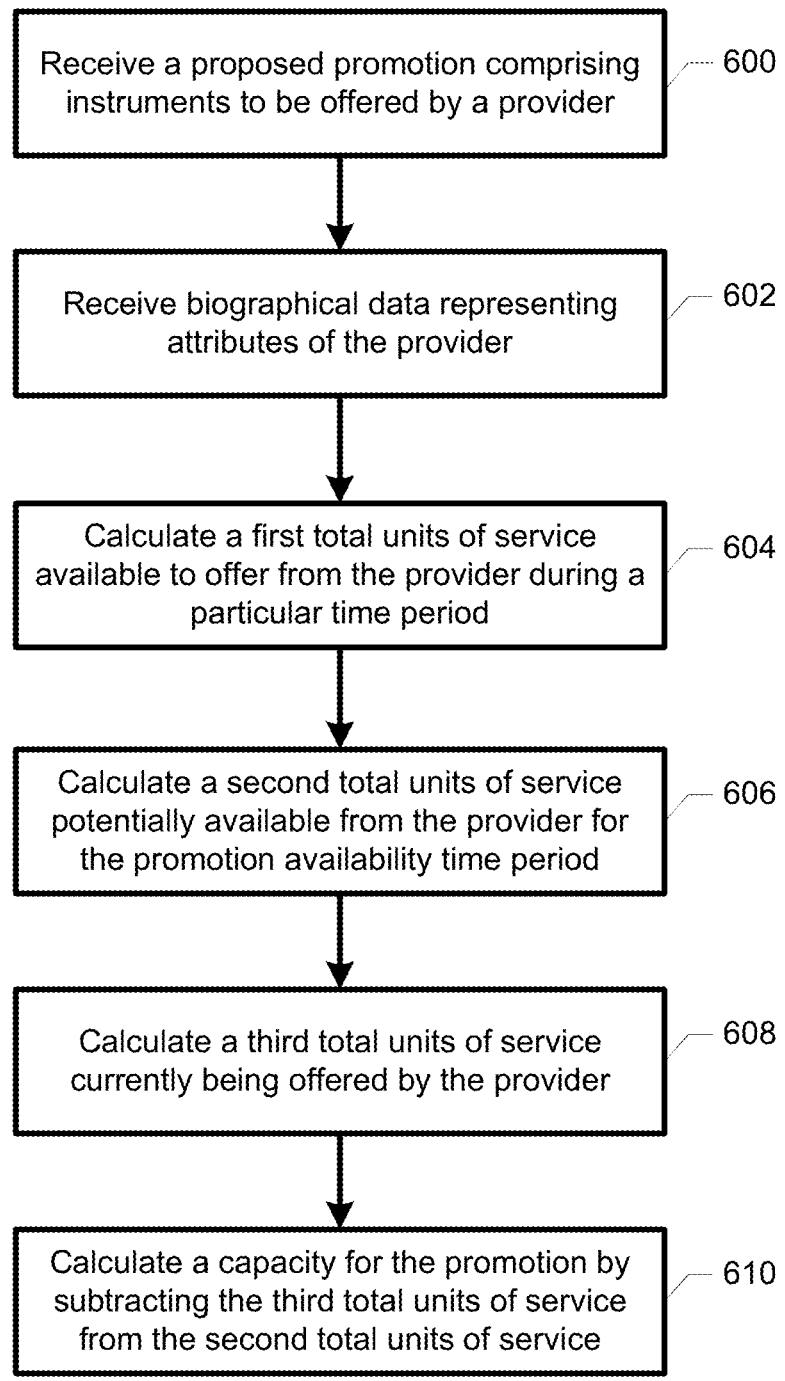
FIG. 6 is a flowchart illustrating operations for calculating the capacity of a proposed promotion, according to example embodiments.

FIG. 6 is a flow diagram of example operations for calculating the capacity of a proposed promotion. In embodiments, the system 100 receives 600 data describing a proposed promotion for a number of instruments to be offered to consumers by a provider. In some embodiments, a promotion instrument indicates a service to be provided by the provider to the consumer at a discount when the instrument is redeemed. In embodiments, a particular proposed promotion is defined in terms of a promotion structure that includes the service to be offered, the number of instruments to be offered, the full value of the service, the discount price being offered, and the time period during which the promotion will be offered (time of promotion availability, hereinafter). In some embodiments, the proposed promotion may be the identified promotion structure of operation 424.

In embodiments, the system 100 receives 602 provider biographical data such as from provider database 104, provider module 106, and/or input/output module 408, for example. In some embodiments, the interface is a graphical user interface (GUI) displayed on a client device such as sales resource device 130 and/or provider device 132. The GUI design may include a variety of data input widgets that receive user selections such as, for example, drop down menus and/or selection boxes displaying multiple choices. Alternatively, in some embodiments, the interface design is a form that provides a layout of data input fields. In some embodiments, the biographical data may coincide with the provider info of the display of FIG. 2O, and/or provided by provider module 106.

In embodiments, at least a portion of the provider biographical data being collected is related to attributes of the particular service being offered in the promotion. For example, a day spa may propose a promotion for a discounted full body massage, which is one type of service provided by the spa. In embodiments, the interface is designed to include questions for the provider that refer to general attributes of the business as well as to attributes specifically related to the service planned to be offered in the promotion. Example questions displayed in the day spa input interface include how many hours per week is the provider open for business, how many employees are available to perform the service per day, how many employees are required to perform the service, and what is the average time spent in providing the service.

In embodiments, the system 100 uses the provider biographical data to calculate 604 the total number of units of service that the provider potentially can have available to offer within a pre-determined period of time, such as with capacity module 108, for example. This total is calculated by determining, based on a time cost, the potential maximum number of units of service that the provider can provide during the period of time and subtracting the actual number of units of service that the provider typically provides during that period. Referring to the day spa example, if the spa potentially can provide 100 full body massages per week and actually provides 50 massages per week, the spa could potentially offer a maximum of 50 instruments for massages per week of the time of promotion availability.

In embodiments, the system 100 calculates 606 a total of units of service that the provider potentially will have available to offer through discount instruments during the time of promotion availability, such as with capacity module 108, for example. Since the business will be offering discount instruments that consumers will redeem during the promotion availability, the actual number of units of service the provider will be providing as a result of the promotion offering will be affected by the rate of instrument redemptions during that time. Thus, in embodiments, the system 100 calculates the predicted total of units of service that the provider potentially will have available based in part on a model of consumer demand for the instruments being offered in the potential promotion.

In embodiments, a model of consumer demand for a proposed promotion is based on historical data representing consumer demand for instruments that were offered during the promotion availability time of similar promotions that now have expired. In various embodiments, the system receives the historical data representing consumer demand for instruments as one or more redemption curves, such as provided by consumer database 102, for example.

In embodiments, the system 100 determines whether there are any outstanding instruments currently being offered by the provider for the particular service to be offered in the proposed promotion. Outstanding instruments may affect the predicted total of units of service that the provider potentially will have available to offer, since the redemption of an instrument may indicate a service that the provider actually will be providing. If the system 100 determines that there are outstanding instruments 135 currently being offered by the provider, the system 100 calculates 608 a total of those outstanding instruments.

In embodiments, the system 100 calculates 610 a maximum number of instruments 145 to be offered in the potential promotion (the promotion capacity hereinafter) by subtracting the total of outstanding instruments from the predicted total of available services. Turning to the example, if it is predicted that the day spa potentially can offer 500 instruments over the time of promotion availability and it is determined that there are 50 instruments currently outstanding, the potential promotion capacity will be set at 450 instruments.

Figure 7:
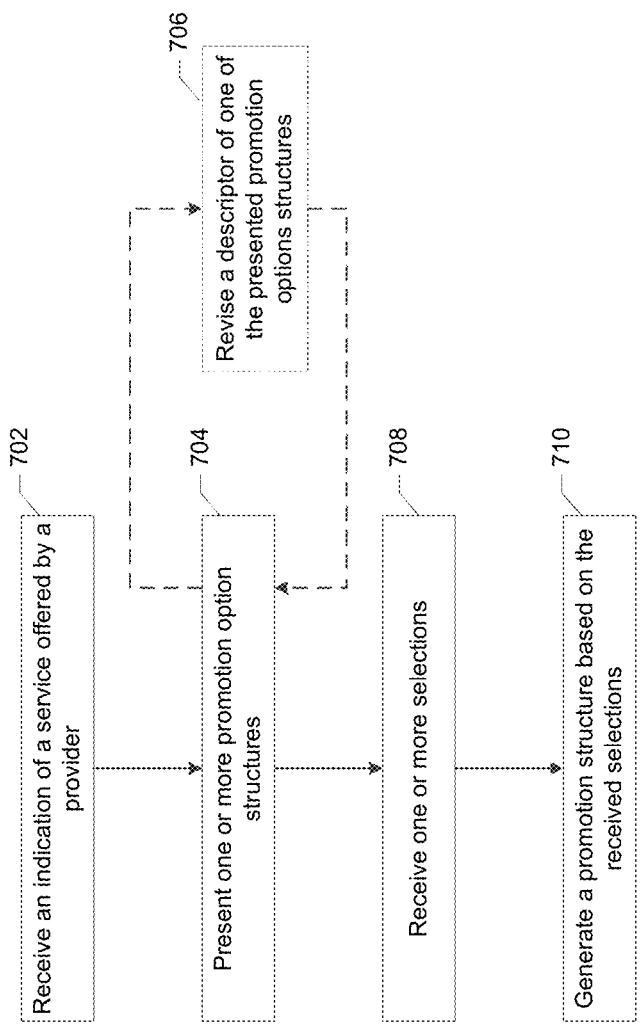
FIG. 7 is a flowchart illustrating operations for generating a promotion structure, according to example embodiments.

Turning now to FIG. 7, a flowchart is illustrated containing example operations for generating a promotion structure, in accordance with example embodiments. The operations illustrated in FIG. 7 may, for example, be performed by the system 100, with the assistance of, and/or under the control of the promotion structure module 110, for example.

In operation 702, system 100 includes means, such as provider database 104, input/output module 408, and/or the like, for receiving an indication of a service offered by a provider.

In operation 704, system 100 includes means, such as promotion structure module 110, input/out module 408, and/or the like, for presenting one or more promotion option structures, wherein each promotion option structure includes at least one option and a descriptor associated with each included option.

In some embodiments, promotion options may be scored and/or ranked by the promotion and marketing service. In some embodiments, a price band may be defined, comprising a range from the single highest price and the single lowest price of subject promotions comprising group of top ranked promotions options, or top percentile. Similarly, a value band may comprise a range from the single greatest value to the single worst value of the subject promotion options, and a discount band may comprise a range from the single largest discount to the single smallest discount of the subject promotion options. As such, in some embodiments, presenting the one or more promotion option structures as described with respect to operation 704 includes presenting an indication of a price band, a value band, and a discount band derived from the one or more promotion options. In at least one such embodiment, the one or more promotion option structures comprises price bands, value bands, and discount bands exceeding predetermined thresholds. In operation 706, system 100 may optionally include means, such as communications module 406, input/output module 408, and/or the like, for receiving a request to edit a descriptor associated with a promotion option structure, presenting a list of available selections for modifying the descriptor, receiving a selection of one of the available selections, and presenting the one or more promotion option structures again, wherein the descriptor for which the request was received is replaced with the selected descriptor.

In operation 708, system 100 includes means, such as communications module 406, input/output module 408, and/or the like, for receiving one or more selections. In some embodiments, receiving the one or more selections comprises receiving selection of one or more of the presented promotion option structures. In other embodiments, receiving the one or more selections may comprise receiving information identifying a custom promotion option structure.

Finally, in operation 710, system 100 includes means, such as promotion structure module 110, or the like, for generating, by a processor, a promotion structure based on the selection. In some embodiments, generating the promotion based on the selection comprises receiving selection of a price, a value, and a margin associated with each selected promotion option structure, generating a corresponding promotion structure, the corresponding promotion structure including fine print associated with each descriptor of the selected promotion option structure, and storing the generated promotion structure.

Figure 8:
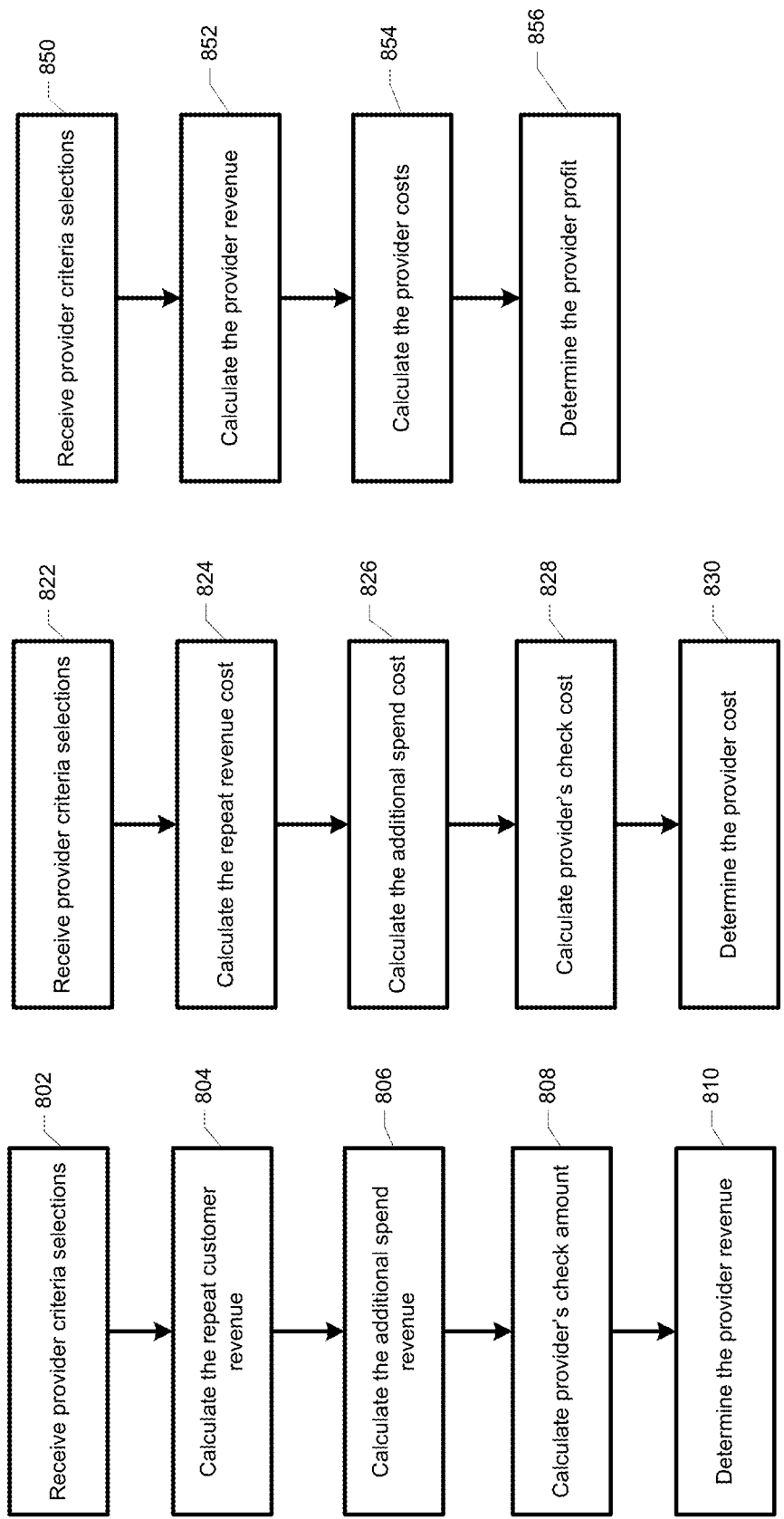
FIGS. 8A-C are flowcharts illustrating operations for providing return in investment (ROI) calculations, according to example embodiments.

FIGS. 8A, 8B, and 8C are flowcharts illustrating one example for calculating ROI information such as based on provider revenue, provider cost, and provider profit, respectfully. The ROI information indicates the potential revenues, cost, and profit to the specific provider based on a promotion proposal.

FIG. 8A shows a diagram of how provider revenue is calculated. In operation 802, the ROI module 112 receives provider criteria selections. These selections may be received from the provider or from a sales resource of the promotion and marketing service who interacts with the provider. These selections comprise inputs indicative of one or more attributes of the promotion, an upsell amount, and one or more indicators of repeat business in response to the promotion. The attributes may include the average check amount for two individuals, the voucher price, the average voucher value, the number of customers per voucher, a unit cap, a provider share, a food cost percentage, a number of impressions, and demographic information about the customers. The indicators of repeat business may include return rate percentage and return visits per year. Using the received attributes, upsell amount, and indicators of repeat business, the provider's revenue is calculated based on revenue from "repeat customer revenue," "additional spend revenue," and "Your Groupon Check" amount calculated based on the received criteria (e.g., provider selected criteria).

In operation 804, the ROI module 112, based on one or more of the attributes received in operation 802, a first amount indicative of revenue generated from repeat customers based on the promotion (e.g., based on repeat business from a consumer following redemption of the promotion). In one embodiment, the repeat customer revenue is calculated using the following formula (as previously described):

Repeat Customer Revenue=Unit Cap×Customers/ Groupon×Average Check for 2×(Return Rate %)×Return Visits/Year In operation 806, the ROI module 112 calculates, based on the upsell amount received in operation 802, a second amount indicative of revenue generated from promotion upsells. This second amount may comprise revenue generated from upsells attendant to administering the promotion. In one embodiment, this second amount is calculated using the following formula (as previously described):

Additional Spend Revenue=Unit Cap×Average Upsell

In operation 808, the ROI module 112 calculates, based on the one or more indicators received in operation 802, a third amount indicative of revenue generated from the promotion and marketing service as a result of the promotion (e.g., payment from the promotion and marketing service to the provider). In one embodiment, the provider's check revenue is calculated using the following formula:

Your Groupon Check=Unit Cap×Merchant Share

In operation 810, the provider's revenue is determined from the first, second, and third amounts.

Subsequently, the ROI module 112 calculates, based on the one or more attributes of the promotion, a fourth amount indicative of costs from the promotion. In this regard, FIG. 8B shows a flow diagram of how this cost is calculated.

In operation 822, the ROI module 112 receives the provider criteria selections. The provider's total cost includes the repeat revenue cost, the additional spend cost, and the provider's check cost. The costs may be calculated by multiplying the corresponding revenue by the received food cost, as described previously. Accordingly, in operation 824, the ROI module 112 calculates the repeat revenue cost. In one embodiment, this calculation comprises multiplying the repeat customer revenue by the Food Cost. In operation 826, the ROI module 112 calculates the additional spend cost. In one such embodiment, this calculation comprises multiplying the additional spend revenue by the Food Cost. In operation 828, the ROI module 112 calculates the provider's check cost, which in one embodiment comprises multiplying the Your Groupon Check revenue by the Average Groupon Value and the Food Cost. Accordingly, in operation 830, the ROI module 112 determines the provider's total cost by adding together the repeat revenue cost, the additional spend cost, and the provider's check cost.

FIG. 8C shows a flow diagram describing an example mechanism by which provider profit is calculated. In operation 850, the ROI module 112 receives the provider criteria selections. In operation 852, the ROI module 112 calculates the provider revenue. In one embodiment, the provider revenue is calculated as shown above in operation 510. Subsequently, in operation 854, the ROI module 112 calculates the provider cost. In one embodiment, the provider cost is calculated as shown above in operation 830. Finally, in operation 856, the ROI module 112 determines the provider profit. In this regard, the provider's profit comprises the provider revenue minus the provider cost.

The ROI functionality described with respect to FIGS. 8A-8C may be integrated into the sales management module so as to provide the functionality to sales resources.

Figure 9:
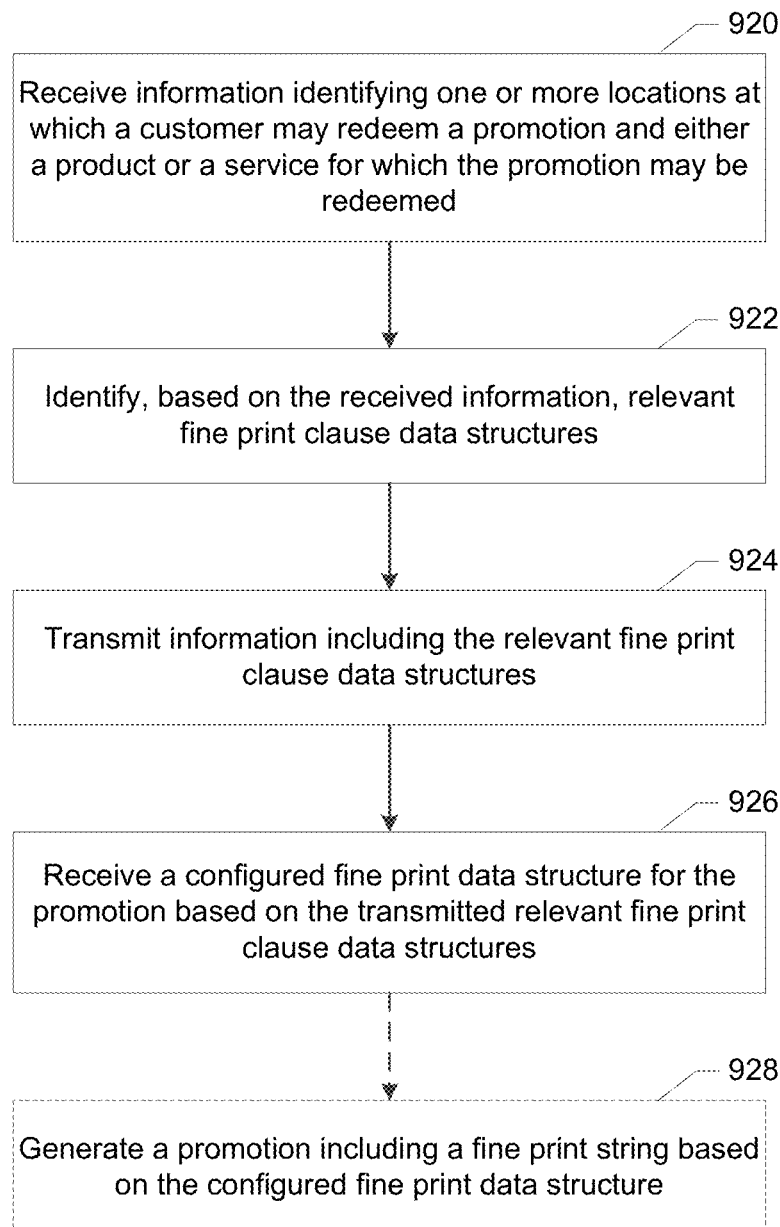
FIG. 9 is a flowchart illustrating operations for generating fine print for a promotion from the perspective of a promotion and marketing service, according to example embodiments.

Turning now to FIG. 9, example operations for generating fine print for a promotion are illustrated from the perspective of a promotion and marketing service. The operations illustrated in FIG. 9 may, for example, be performed by the promotional system 100. In operation 920, the promotional system 100, may include means, such as processor 402 and/or the like, for receiving information identifying a location at which a customer may redeem a promotion and either a product or a service associated with the promotion. This information may be received from a sales representative device 130 or a provider device 132 and via a network 416, as illustrated in FIG. 3. However, in some embodiments, this information may be received by direct user input using input/output module 408.

In operation 922, the promotional system 100 may include means, such as processor 402 and/or the like, for identifying, based on the received information (e.g. information about the promotion such as the service or good offered, the location of the provider offering the promotion, the category or sub-category of the promotion within a service taxonomy, a price or the like), relevant fine print clause data structures. For example, for a food and drink meal at a five star restaurant location, a relevant fine print clause data structure may include a clause regarding suitable attire, which may not be relevant for a promotion regarding a baseball game. Similarly, a fine print clause data structure may be relevant for a promotion for skydiving, while not relevant for a promotion for a discount on ice cream. In other examples, a promotion related to a nightclub may have an age restriction, where a travel promotion may include black-out dates.

In one embodiment, at least one fine print clause data structure includes configurable text, such as by referencing a configurable text data structure. In another embodiment, each identified fine print clause data structure includes fields indicating default instructions regarding whether an associated fine print clause is required for the promotion, selected for inclusion in the promotion, or should be shown to a user for selection. In yet another embodiment, each fine print clause data structure includes a rating indicating an impact upon promotion performance. In this regard, the rating may be calculated based on historical performance of previously offered promotions.

In operation 924, the promotional system 100 includes means, such as the processor 402, input/output module 408, communications module 406, and/or the like, for transmitting information including the relevant fine print clause data structures identified in operation 922. Accordingly, in embodiments in which presentation information is retrieved, the information transmitted may include the presentation information. Although in many embodiments information is transmitted to the device from which information is received, return transmission is not a necessity, and the identified relevant fine print clause data structures may be transmitted to another device (e.g., if the information is received from a provider, the fine print clause information may be transmitted to a sales resource device 130).

In operation 926, the promotional system 100 includes means, such as the processor 402, input/output module 408, communications module 406, and/or the like, for receiving a configured fine print data structure for the promotion based on the transmitted relevant fine print clause data structures.

In operation 928, the promotional system 100 may include means, such as processor 402 and/or the like, for generating a promotion including a fine print string based on the configured fine print data structure. In this regard, creating the fine print string includes generating a string including the language from each of the selected fine print clauses and any redemption information contained in the configured fine print data structure. In one embodiment, each fine print clause includes a mapping to a string in each of a variety of languages, so that the generated promotion may include fine print in a relevant language (e.g., a promotion redeemable in Spain may thus include Spanish fine print).

The fine print builder functionality described with respect to FIG. 9 may be integrated into the sales management module so as to provide the functionality to sales resources. In some examples, the fine print builder functionality described with respect to FIG. 9 may be incorporated in the fine print interface described with respect to FIG. 2K.

Figure 10:
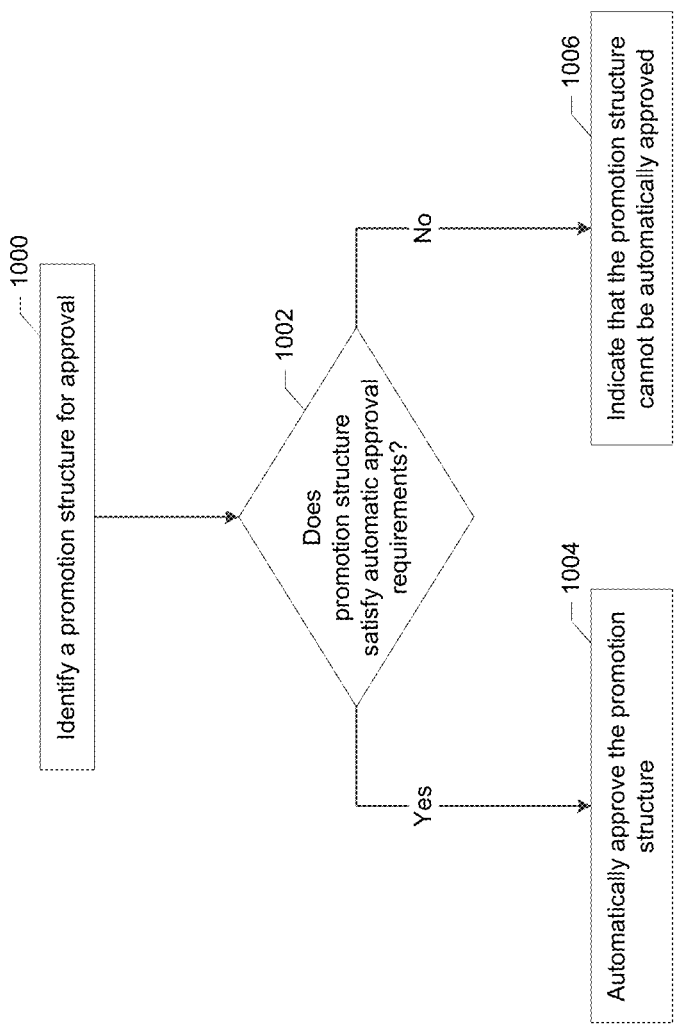
FIG. 10 is a flowchart illustrating operations for automatically approving promotion structures, according to example embodiments.

Turning now to FIG. 10, a flowchart is illustrated containing example operations for automatic approval of promotion structures, in accordance with some example embodiments. The operations illustrated in FIG. 10 may, for example, be performed by the promotional system 100.

In operation 1000, promotional system 100 may include means, such as processor 402 and/or the like, for identifying a promotion structure for approval, the promotion structure defining a promotion to be displayed via a promotion and marketing service. In some example embodiments, identifying a promotion structure for approval includes receiving selection of one or more options and descriptor associated respectively with the one or more options, receiving selection of a price, a value, and a margin for each of the one or more options, and generating a promotion structure including fine print associated with descriptors of the one or more selected options.

In operation 1002, promotional system 100 includes means, such as processor 402 or the like, for determining whether the promotion structure satisfies automatic approval requirements, the automatic approval requirements including one or more parameters relating to the promotion structure. This may include determining whether a price associated with the promotion structure falls outside of a price band associated with the promotion structure. Additionally or alternatively, this determination may include determining whether a value associated with the promotion structure falls outside of a value band associated with the promotion structure. Additionally or alternatively, this determination may include determining whether a margin associated with the promotion structure falls below a necessary margin. Additionally or alternatively, this determination may include determining whether fine print associated with the promotion structure comprises restrictive fine print. Additionally or alternatively, this determination may include determining whether an expiration date associated with the promotion structure falls outside of an expiration band associated with the promotion structure, or indicates a promotional term shorter than a minimum required duration. Additionally or alternatively, this determination may include determining whether a sales lead evaluation indicates approval of the promotion structure.

In operation 1004, promotional system 100 includes means, such as input/output module 408, communications module 406, and/or the like, for, in an instance in which the promotion structure satisfies the automatic approval requirements, automatically approving the promotion structure for display via the promotion and marketing service. However, in operation 1006, promotional system 100 includes means, such as input/output module 408, communications module 406, and/or the like, for in an instance in which the promotion structure does not satisfy the automatic approval requirements, indicating that the promotion structure cannot be automatically approved. In this regard, the auto-approval status may be considered to be not approved or unapproved. An auto-approval status of unapproved may not necessarily mean the proposal will not be approved. Rather, an auto-approval status of unapproved or not approved may mean that the proposal may need to be reviewed by a sales resource or the promotion and marketing service before the promotion is generated and offered.

The automatic approval functionality of FIG. 10 may be integrated into the sales management module 120. Accordingly, the sales management module 120 may improve the process by which new promotions are negotiated with providers, increase the likelihood of presenting providers with strong options, improve the user experience of both sales resources and providers, and reduce reliance on managers for approval.

Furthermore, as described above, providing sales resources with a consolidated system for managing sales proposals may increase efficiency of the sales resources. Sales resources may use the promotion system 100 to access ROI information, demand information, and capacity information to have more effective conversations and follow-up meetings with providers by avoiding down time lost to accessing different systems and modules. In some instances, a proposal may be automatically approved, such that the sales resource does not need to review the proposal prior to generation of the promotion.

As such, the method, apparatus and computer program product provide numerous technical advantages including the conservation of processing resources and the associated power consumption otherwise expended accessing various applications to access proposed promotions and monitoring changes that a provider may make to a proposal. According to example embodiments, providers and sales resources may access a single provider facing interface to collaborate on a proposed promotion, while the opportunity for auto-approval of the proposal is maintained, thereby facilitating generation of promotions in an expeditious and efficient manner.

As described above and as will be appreciated based on this disclosure, embodiments of the present invention may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Embodiments of the present invention have been described above with reference to block diagrams and flowchart illustrations of methods, apparatuses, systems and computer program products. It will be understood that each block of the circuit diagrams and process flowcharts, and combinations of blocks in the circuit diagrams and process flowcharts, respectively, can be implemented by various means including computer program instructions. These computer program instructions may be loaded onto a general purpose computer, special purpose computer, or other programmable data processing apparatus, such as processor 402, modules 106, 108, 110, 112, 114, 116, 118, and/or 120 to produce a machine, such that the computer program product includes the instructions which execute on the computer or other programmable data processing apparatus create a means for implementing the functions specified in the flowchart block or blocks.

These computer program instructions may also be stored in a computer-readable storage medium (e.g., memory 404) that can direct a computer or other programmable data processing apparatus to function in a particular manner, such that the instructions stored in the computer-readable storage medium produce an article of manufacture including computer-readable instructions for implementing the function discussed herein. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions discussed herein.

Accordingly, blocks of the block diagrams and flowchart illustrations support combinations of means for performing the specified functions, combinations of steps for performing the specified functions and program instruction means for performing the specified functions. It will also be understood that each block of the circuit diagrams and process flowcharts, and combinations of blocks in the circuit diagrams and process flowcharts, can be implemented by special purpose hardware-based computer systems that perform the specified functions or steps, or combinations of special purpose hardware and computer instructions.

Many modifications and other embodiments of the inventions set forth herein will come to mind to one skilled in the art to which these embodiments of the invention pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Terms other than those expressly defined in the Glossary section above are used in a generic and descriptive sense only and not for purposes of limitation.

That which is claimed:

1. A computer-implemented method for, in response to a modification of a proposal by a provider via a user interface, providing automated approval and generation of promotions to be made available to consumers for purchase, the computer-implemented method comprising:
    causing rendering of a user interface component on a provider device for facilitating entry of at least one service offered by the provider, and a time needed by the provider to fulfill each service;
    receiving, from the provider device over a network, an indication of the at least one service offered by the provider, and the respective times needed by the provider to fulfill each service;
    calculating capacity information for the provider, wherein the capacity information represents a total units of the at least one service that a provider is able to provide during a time period, and the capacity information is calculated by a capacity module by dividing an estimated availability by a time needed by the provider to fulfill promotions;
    identifying a promotion structure from a plurality of promotion structures by:
        causing the plurality of promotion option structures to be presented on the provider device, wherein the plurality of promotion option structures include at least one of a descriptor and a price;
        receiving, from the provider device, the promotion structure that is selected;
        generating the quantity of units of the promotion structure to be offered by dividing the capacity information for the provider by the time need by the provider to fulfill each service that is comprised by the promotion structure; and determining a corresponding units per month of promotions to be made available, wherein the units per month are determined such that the capacity information indicates the provider is able to fulfill the units per month of promotions according to the promotion structure;

causing rendering of at least an additional user interface component for facilitating the adjustment of at least one of the units per month or the price;

responsive to the adjustment of at least one of the units per month or the price via the additional user interface component, determining the promotion structure satisfies automatic approval requirements by calculating a return on investment (ROI) of the promotion structure and comparing the ROI of the promotion structure to at least one predefined threshold for a return on investment;

determining an automatic approval status as approved; and generating the promotion having the promotion structure and the corresponding units per month, such that the units per month of the promotion are made available for purchase by consumers.

2. The computer-implemented method of claim 1, wherein calculating the ROI comprises:

calculating, based on one or more attributes of the promotion structure, a first amount indicative of revenue generated from the promotion structure;

calculating, based on an upsell amount exceeding a value of the promotion structure, a second amount indicative of revenue generated from upsells attendant to administering the promotion structure;

calculating, based on the one or more indicators of repeat business in response to the promotion structure, a third amount indicative of revenue generated from a promotion and marketing service based on the proposed promotion; and calculating, based on the one or more attributes of the promotion structure, a fourth amount indicative of costs from the promotion structure.

3. The computer-implemented method of claim 1, wherein the auto-approval status is further based on the capacity information, and calculating the capacity information comprises:

calculating a first total units of service available to offer from the provider during a particular time period;

calculating a second total units of service potentially available from the provider for an availability time period of the promotion;

calculating a third total units of service currently being offered by the provider; and calculating the capacity information for the promotion by subtracting the third total units of services from the second total units of service.

4. An apparatus for, in response to a modification of a proposal by a provider via a user interface, providing automated approval and generation of promotions to be made available to consumers for purchase, the apparatus comprising a processor and at least one memory configured to:

cause rendering of a user interface component on a provider device for facilitating entry of at least one service offered by the provider, and a time needed by the provider to fulfill each service;

receive, from the provider device over a network, an indication of the at least one service offered by the provider, and the respective times needed by the provider to fulfill each service;

calculate capacity information for the provider, wherein the capacity information represents a total units of at least one service that a provider is able to provide during a time period, and the capacity information is calculated by dividing an estimated availability by a time needed by the provider to fulfill promotions, wherein an indication of at least one service offered by the provider, the estimated availability, and the time needed by the provider to fulfill each service are received from a provider device and transmitted over the network;

identify a promotion structure from a plurality of promotion structures by:

causing the plurality of promotion option structures to be presented on the provider device, wherein the plurality of promotion option structures include at least one of a descriptor and a price;

receiving, from the provider device, the promotion structure that is selected;

generating the quantity of the promotion structure to be offered by dividing the capacity information for the provider by the time need by the provider to fulfill each service that is comprised by the promotion structure; and determining a corresponding units per month of promotions to be made available, wherein the promotion structure and the units per month are determined such that capacity information indicates the provider is able to fulfill the units per month of promotions according to the promotion structure;

cause rendering of at least an additional user interface component for facilitating the adjustment of at least one of the units per month or the price;

responsive to the adjustment of at least one of the units per month or the price via the additional user interface component, determine the promotion structure satisfies automatic approval requirements by calculating a return on investment (ROI) of the promotion structure and comparing the ROI of the promotion structure to at least one predefined threshold for a return on investment;

determine an automatic approval status as approved; and generate the promotion having the promotion structure and the corresponding units per month, such that the units per month of the promotion are made available for purchase by consumers.

5. The apparatus of claim 4, wherein calculating the ROI comprises:

calculating, based on one or more attributes of the promotion structure, a first amount indicative of revenue generated from the promotion structure;

calculating, based on an upsell amount exceeding a value of the promotion structure, a second amount indicative of revenue generated from upsells attendant to administering the promotion structure;

calculating, based on the one or more indicators of repeat business in response to the promotion structure, a third amount indicative of revenue generated from a promotion and marketing service based on the proposed promotion; and calculating, based on the one or more attributes of the promotion structure, a fourth amount indicative of costs from the promotion structure.

6. A computer program product for, in response to a modification of a proposal by a provider via a user interface, providing automated approval and generation of promotions to be made available to consumers for purchase, the computer program product comprising at least one non-transitory computer-readable storage medium having computer-executable program code instructions stored therein, the computer-executable program code instructions comprising program code instructions to:
- cause rendering of a user interface component on a provider device for facilitating entry of at least one service offered by the provider, and a time needed by the provider to fulfill each service;
- receive, from the provider device over a network, an indication of the at least one service offered by the provider, and the respective times needed by the provider to fulfill each service;
- calculate capacity information for the provider, wherein the capacity information represents a total units of service that a provider is able to provide during a time period and the capacity information is calculated by dividing an estimated availability by a time needed by the provider to fulfill promotions, wherein an indication of a service offered by the provider, the estimated availability, and the time needed by the provider to fulfill each service are received via a provider facing interface on a provider device and transmitted over the network;
- identify a promotion structure from a plurality of promotion structures by,
  - causing the plurality of promotion option structures to be presented on the provider device, wherein the plurality of promotion option structures include at least one of a descriptor and a price;
  - receiving, from the provider device, the promotion structure that is selected; and
- generating the quantity of units of the promotion structure to be offered by dividing the capacity information for the provider by the time need by the provider to fulfill each service that is comprised by the promotion structure; and
- determine a corresponding units per month of promotions to be made available, wherein the units per month are determined such that the capacity information and the service offered by the provider indicates the provider is able to fulfill the units per month of promotions according to the promotion structure; and
- cause rendering of at least an additional user interface component for facilitating the adjustment of at least one of the units per month or the price;
- responsive to the adjustment of at least one of the units per month or the price via the additional user interface component, determine the promotion structure satisfies automatic approval requirements by calculating a return on investment (ROI) of the promotion structure and comparing the ROI of the promotion structure to at least one predefined threshold for return on investment;
- determine an automatic approval status as approved; and
- generate the promotion having the promotion structure and the corresponding units per month, such that the units per month of the promotion are made available for purchase by consumers.

7. The computer-implemented method of claim 1, further comprising:
- responsive to the adjustment of at least one of the units per month or the price via the additional user interface component, and the determination that the promotion structure satisfies automatic approval requirements, causing a real-time or near real-time indication to be provided via the user interface of the automatic approval status.

8. The computer-implemented method of claim 1, further comprising:
- receiving an indication of a subsequent adjustment of at least one of the units per month or the price via the additional user interface component, such that the automatic approval requirements are no longer satisfied; and
- in response to determining the automatic approval requirements are no longer satisfied, causing a visual indication thereof to be provided via the user interface.

9. The apparatus of claim 4, wherein the processor and at least one memory are further configured to:
- responsive to the adjustment of at least one of the units per month or the price via the additional user interface component, and the determination that the promotion structure satisfies automatic approval requirements, cause a real-time or near real-time indication to be provided via the user interface of the automatic approval status.

10. The apparatus of claim 4, wherein the processor and at least one memory are further configured to:
- receive an indication of a subsequent adjustment of at least one of the units per month or the price via the additional user interface component, such that the automatic approval requirements are no longer satisfied; and
- in response to determining the automatic approval requirements are no longer satisfied, cause a visual indication thereof to be provided via the user interface.

11. The computer program product of claim 6, wherein the computer-executable program code instructions further comprise program code instructions to:
- responsive to the adjustment of at least one of the units per month or the price via the additional user interface component, and the determination that the promotion structure satisfies automatic approval requirements, cause a real-time or near real-time indication to be provided via the user interface of the automatic approval status.

12. The computer program product of claim 6, wherein the computer-executable program code instructions further comprise program code instructions to:
- receive an indication of a subsequent adjustment of at least one of the units per month or the price via the additional user interface component, such that the automatic approval requirements are no longer satisfied; and
- in response to determining the automatic approval requirements are no longer satisfied, cause a visual indication thereof to be provided via the user interface.

* * * * *